US006367823B1

(12) United States Patent
Miyagi

(10) Patent No.: US 6,367,823 B1
(45) Date of Patent: Apr. 9, 2002

(54) WALKING AID

(75) Inventor: Kaoru Miyagi, Tokyo (JP)

(73) Assignee: Satsuki Co., Ltd., Tokyo (JP)

( * ) Notice: Subject to any disclaimer, the term of this patent is extended or adjusted under 35 U.S.C. 154(b) by 0 days.

(21) Appl. No.: 09/330,000

(22) Filed: Jun. 11, 1999

(30) Foreign Application Priority Data

| | | | |
|---|---|---|---|
| Jun. 11, 1998 | (JP) | .......................................... | 10-163301 |
| Jun. 11, 1998 | (JP) | .......................................... | 10-163302 |
| Oct. 12, 1998 | (JP) | .......................................... | 10-289057 |

(51) Int. Cl.[7] ................................................. B62B 3/00

(52) U.S. Cl. ............................... 280/47.34; 280/87.05; 280/47.11

(58) Field of Search .......................... 280/87.05, 47.34, 280/651, 639, 642, 649, 650, 647, 657, 658, 47.38, 47.4, 47.11; 297/42, 44, 43, 5; 5/86.1

(56) References Cited

U.S. PATENT DOCUMENTS

| | | | | | |
|---|---|---|---|---|---|
| 4,077,641 | A | * | 3/1978 | Perego ....................... | 280/647 |
| 4,111,454 | A | * | 9/1978 | Kassai ........................ | 280/649 |
| 4,232,897 | A | * | 11/1980 | Maclaren et al. ........... | 280/639 |
| 4,542,916 | A | * | 9/1985 | Kassai ........................ | 280/642 |
| 4,907,794 | A | * | 3/1990 | Rose | |
| 5,221,106 | A | * | 6/1993 | Shamie ....................... | 280/649 |
| 5,984,406 | A | * | 11/1999 | Lee .......................... | 297/42 X |
| 6,099,002 | A | * | 8/2000 | Uchiyama ............ | 280/87.05 X |

FOREIGN PATENT DOCUMENTS

| | | | |
|---|---|---|---|
| FR | 2458443 | * | 2/1981 |
| JP | 11115763 | * | 4/1999 |

* cited by examiner

*Primary Examiner*—Paul N. Dickson
*Assistant Examiner*—Bryan Fischmann
(74) *Attorney, Agent, or Firm*—Wenderoth, Lind & Ponack, L.L.P.

(57) ABSTRACT

A walker for the aged or for a baby includes a first reinforcement section 57 composed of a first pair of traction rods 56 which are arranged to form an X-letter shape. A second reinforcement section 59 is composed of a second pair of traction rods 58 which are also arranged to form an X-letter shape. A tension device 61 is provided at both sides of the walker, and each tension device is composed of a pair of tension rods 60 having outer ends which pivot on the front legs 32 and the rear legs 34, respectively, and having inner ends which are rotatably connected with each other by using pins or the like. These structures achieve a very excellent function for avoiding any shaking or distortion of the walker 30 in the front and rear direction and the width direction when the walker 30 is in the opened condition.

36 Claims, 17 Drawing Sheets

A-A

B-B

WALKING AID

BACKGROUND OF THE INVENTION

The present invention relates to a walker to be used by the aged, and also relates to a baby walker. In particular, it relates to a structure that is foldable in two directions (i.e., the front/rear direction and the width direction), to a folding structure of a push rod section of the walker, and to an immobilizing mechanism which enables a user to easily manually halt the walker.

Recently, walkers of various types have been widely used as walking aids by aged persons who have weakened legs and limbs, replacing walking sticks or canes.

Thus, many kinds of walkers have been developed. For example, there are walkers with a seat portion so that the user may sit down on the seat portion anywhere at which the user becomes tired, and walkers with a storage space for storing goods after shopping. Many walkers also have a brake device for reducing the moving speed of the walker when, for example, going down a slope, and an immobilizing mechanism for inhibiting the movement of the walker.

It is desirable for the aged that the walker be capable of being stored in as small a space as possible, similar to a conventional baby cart. However, although the conventional walkers can be folded in the front-to-rear direction, many walker can not be folded in the widthwise (i.e., left-to-right) direction because of the comparatively large weight of the aged in comparison with the weight of a baby. As a result, a heavier structure is required to withstand weight of at least about 100 Kg. Furthermore, the requirement that the cart be foldable not only in the front-and-rear direction but also in the widthwise direction creates an undesirably complex mechanical construction and a heavy weight thereof.

The applicants of this application have filed a Japanese patent application relating to a handcart on Oct. 14, 1997, (Japanese Patent Application No. 9-280253).

According to the Japanese patent application, the handcart 15 is constructed, as shown in FIGS. 29 to 33, of a right and left pair of legs 1 and rear legs 2. A push rod 3 with an approximately U-letter shape has side portions which are mounted on the front legs, and the upper end portions of the push rod 3 are connected with each other. A right and left pair of seat rods 4 each have one end pivoted on a respective rear leg 2 and an intermediate portion pivoted on a respective front leg 1. A front connecting member 6 is composed of a pair of rigid members each including an outer end portion pivoted on the front leg, and each including an inner end portion rotatably supported around a pivot means 5. A rear leg connecting member 8 is composed of a pair of rigid members connecting the rear legs, and each of the pair include an outer end portion pivoted on the rear leg and an inner end portion rotatably supported around a pivot means 7. A pair of open/close rods 10 (FIG. 31) are arranged to have an approximately X-letter shape, and a lower end portion of each rod 10 is pivoted on one of the rear legs 2 and while upper end portion of each rod 10 is pivoted on the other rear leg 2 and the intermediate portions of each rod 10 is rotatably supported by a pivot means 9. A pair of operation rods 12 each have an outer end portion pivoted above the pivot means 9 on the open/close rods 10, and each have an inner end portion rotatably supported around a pivot means 11. A flexible connecting member 13 connects the pivot means 11 (which allows the inner end portion of each of the pair of operation rods 12 to pivot) and the pivot means 7 (which pivots on the inner end portion of the rear leg connecting member 8). Traction rods 14 each have lower end portions pivoted at a position adjacent to the pivot means 5 (rather than the center position) of each rigid member of the front leg connecting member 6, and each have upper end portions pivoted on one of the seat rods 4 at a position between two pivot means. Sliders 16 are provided for sliding the upper end portion of each rear leg with respect to each front leg when the walker is folded. (FIG. 30).

Furthermore, as shown in FIGS. 32 and 33, the push rod 3 is composed of a right and left pair of outer rods 17, a pair of inner rods 18 for sliding within the outer rods 17, a pair of rotation members 19 rotatable in the circular direction with respect to the upper end portion of each of the inner rods 18, a pair of handle portions 21 each having a lower end portion fixed on one of the rotation members 19 through a pin 20. Thus, the push rod 3 can be extended upwardly and then curved by about 90 degrees to form a pair of right-angle elbows. A connecting rod 22 extends upwardly from the upper horizontal portions of handle portion 21 to connect the horizontal portions. Moreover, the upper portion of each inner rod 18 is received in a respective rotation member 19, and the lower portion thereof is rotatably received in a respective outer rod 17. A plurality of holes 23 are provided on each outer rod 17 and each inner rod 18 with a constant gap. Thus, a vertical adjustment of the position of the handle portion 21 can be accomplished by inserting the pin into one of the holes 23.

Moreover, grooves 24 are formed on the rotation member 19, and the projected portion 25 mounted on the upper end portion of each inner end portion 18 is fitted in the groove 24. Thus, the rotation of the handle portions 21 around the inner rods 18 within a range of about 90 degrees can be achieved.

The hold member 26 for holding the inner end portion of each of the pair of operation rods 12 is moved upwardly. Furthermore, the pivot means 7 of the rear leg connecting members 8, 8 is moved upwardly through the connection member 13. As shown in FIG. 33 the horizontal portion of the pair of handle portions 21 is moved rearwardly by pulling the connection rod 22 rearwardly, and then the projected portion 25 moves in the groove 24 of each rotation member 19 outwardly from the position as shown in FIG. 32. By this, the walker 15 is compressed in the widthwise direction by the open/close rod 10 and simultaneously compressed in the front-to-rear direction by the front leg connecting members 6, 6 and the traction rods 14, 14. Thus, a position of being folded in the front-to-rear direction and the right-to-left direction is achieved.

By pushing the connection rod 22 forward, the horizontal portions of the pair of handle portions 21 are aligned on a straight line at the horizontal position, and the walker is expanded in the widthwise direction by expanding the open/close rod 10 to form an X-letter shaped formation. Furthermore, the walker is also expanded in the front-to-rear direction by the front leg connecting members 6,6 and the traction rods 14, 14 to achieve the expanded position as shown in FIGS. 29 and 31.

By this construction, there is presented a novel walker capable of supporting an adult in a stable manner, and also capable of being freely foldable in the front-to-rear direction and also the right-to-left direction safely and surely.

The connecting rod 22 is composed of two links A, B having recess portions as shown in FIG. 34, (JPA-1-297372). One end of each of the links A and B is connected to one of the handle portions through pins 27*a*, 27*b*, and the other end is connected to the other handle portion through the pins 28*a*, 28*b* sliding within the longitudinal slits mounted thereon. By operating the knob 29 contacting with the recess portion, two links A and B move thereby so as to enable the handle portion 21 to move from the straight state (FIG. 34A) to the folded state (FIG. 34B).

Moreover, a brake device, in which braking plates are depressed on the right and left rear wheels so as to brake the rear wheels, is generally known in the art. The brake plate is operated by a mechanism that is similar to the brake mechanism used in bicycles. Moreover, an immobilizing device having a push rod inserted from a side portion into projected portions which radially extend from and are integrally formed with the wheel at the periphery of the center hub of each of the right and left rear wheels is also known, and this device inhibits the rotation of the wheels. Moreover, a push rod operated from an outer radial direction of the wheel toward the center is also known, and the push rod contacts the projected portion extending in the radial direction at the periphery of the center of the rear wheel, thereby achieving the brake operation. The above-mentioned push rod may be operated by a foot by way of an operation rod for actuating the push rod, or it may be operated by a side lever.

SUMMARY OF THE INVENTION

The walker for the aged as mentioned above may be smoothly folded in the front-to-rear direction and in the widthwise direction. However, it is somewhat difficult to effectively prevent a shaking motion in the widthwise direction when the walker is open. The problem is caused by an insufficient rigidity in the widthwise direction when the walker is used in the opened condition. The object of the present invention is to present a walker having a novel structure for more effectively preventing the walker from shaking in the front-to-rear direction and in the widthwise direction when opened, in comparison with the conventional walker which can be folded in the front-to-rear direction and in the widthwise direction.

Moreover, in the conventional walker, the connecting rod 22 is composed of a pair of links with a complex structure. Furthermore, the links are rotated and moved along a straight line by utilizing pins and sliding grooves, thereby making the structure complex and expensive. The present invention, however, presents a connecting rod with a simple structure that is not expensive and can be folded rapidly.

Furthermore, in the conventional walker, the immobilizing device is heavy, thus increasing the overall weight of the walker. Furthermore, according to the walker having a foot pedal for actuating the immobilizing device, it is necessary to support both the user's weight and the weight of the walker by using one leg of the user, and simultaneously depressing the foot-pedal by using the other leg of the user, thereby undesirably making the operation of the immobilizing device difficult. Furthermore, it has been difficult to combine the folding mechanism and the immobilizing device, resulting in a complex structure. Therefore, there has been danger that only one of the pair of immobilizing devices is effected, although it is necessary that left and right wheels be simultaneously stopped by the immobilizing device.

In order to solve the above-mentioned problems, the walker 30 of the present invention is provided with a tension reinforcement device for preventing shaking or distortion of the walker 30 in the front-to-rear direction and in the right-to-left direction as follows. The tension reinforcement device includes a first reinforcement device 57 composed of a first pair of traction rods 56 having lower end portions which pivot on the rigid member 40 at one side (right side or left side) of the front connecting member 41. The upper end portions of the first pair of traction rods 56 are pivoted on a position between the pivot means 36, 37 of the seat rod 38 of the other side (left side or right side). The first pair of traction rods 56 are arranged to form an X-letter shaped cross as is apparently shown in FIG. 3. A second reinforcement means 59 is composed of a second pair of traction rods 58 having lower end portions which are pivoted on a side (right side or left side) of the front leg 32 at a position adjacent to the front wheel 31. The upper end portions of the second pair of traction rods 58 are pivoted on a position between the pivot means 37 of seat rod 38 and the other end (front end) of seat rod 38. The second pair of traction rods 58 are disposed as forming an X-letter shaped cross as is apparently shown in FIG. 3.

Those reinforcement means 57 and 59 prevent the shaking or the distortion in the left and right direction of the walker 30.

This effect is very important when any shaking of the body of the walker should be avoided during moving thereof, as with a baby walker. However, in a walker for the aged in which small amount of shaking is allowable for the aged, one of the reinforcement devices may be omitted for avoiding any increase in the walker's weight.

Moreover, the walking 30 of the present invention has a tension device 61 at both sides, and the tension device 61 is composed of a pair of tension rods 60 having first ends which pivot on the front legs 32 and the rear legs 34 at one side (right side or left side), respectively. The second ends of the tension rods 60 are rotatably connected with each other by using pins or the like. This achieves a very excellent function of avoiding any shaking or any distortion of the walker 30 in the front-to-rear direction.

Moreover, the push rod and the front legs of the walker of the present invention are formed with an integral member. Therefore, the distortion or shaking due to distortion of the walker 30 can be completely avoided.

Moreover, according to the present invention, the walker has at least a right and left pair of front legs, a right and left pair of rear legs, and a push rod. The push rod has vertical portions extending upwardly and has a lateral portion for connecting the upper ends of the vertical portions in the widthwise direction. The vertical portions each have a fixed portion at the lower side and a rotation portion rotatable with respect to the fixed portion at the upper side. The lateral portion for connecting the left and right rotation portions includes a coupling rod 67 pivotably attached at the intermediate portion through the connecting rod 92. In the walker which is foldable in the front-to-rear direction and the widthwise direction, the coupling rod 67 is composed of a pair of sliding bodies 102 and 103, a spring 12 1*a* for urging the sliding bodies such that the sliding bodies become adjacent to each other, an actuator 104 for actuating the sliding bodies such that the sliding bodies move apart from each other against the resilient force of the spring, and a knob 124 for operating the actuator. When the walker is in the opened condition, the sliding bodies are engaged through the connecting rod so as to maintain the lateral portion on a substantially straight line due to the resilient force of the spring. If the actuator is operated, the actuator renders the sliding bodies to be positioned apart from each other against the resilient force due to the spring so as to release the engagement, between the sliding bodies and the connecting rod and allow a free movement of the coupling rod 67 in a forward or backward direction.

According to the present invention, a single operation means 131, a plurality of immobilizing devices 133, and a force transmission means 134, 135 or 198 for coupling the operation mechanism 131 and the plural immobilizing devices 133. The operation means 131 has an operation lever 83 having a rotation portion 144 and an operation portion 145 for operating the rotation portion 144. The rotation portion 144 has a pivot means in opening 148 which can be pivoted on the walker 30 and a groove 146 and straight hole 147 for receiving one end of the force transmission means 134 and 198. The immobilizing device 133 has legs having a contact piece 188, and has a fixing means 194 for fixing the other end of the force transmission means 135 and 198. The legs are pivoted on the wheel supporting legs 34 and 34 supporting the wheels 33 and 33. The force transmission means 134, 135 and 198 maintain a predetermined gap between the operation means 131 and the immobilizing device 133, and transmit movement of the operation means 131 to the immobilizing device 133. Thus, the plural immobilizing devices 133 and 133 are simultaneously actuated by operating the singe operation means 131.

BRIEF DESCRIPTION OF THE DRAWINGS

FIGS. 5A to 5C are views for explaining the structure of the push rod, wherein FIG. 5A is a view for explaining the relationship between the lower side rod and the upper side rod, FIG. 5B is a sectional view taken along the line A—A in the view FIG. 5A, and FIG. 5C is a sectional view taken along the line B—B in the view FIG. 5A;

FIGS. 6A to 6D are views for explaining the structure of the connecting rod, wherein FIG. 6A is a plan view of the connecting rod, FIG. 6B is a longitudinal sectional view of the connecting rod, FIG. 6C is a lateral sectional view showing the connecting rod in a straight condition, and FIG. 6D is a lateral sectional view of the connecting rod in a folded condition;

FIGS. 7A to 7E are views for explaining the parts composing the connecting rod, wherein FIG. 7A is a view showing the upper housing of the connecting rod, FIG. 7B is a view showing the lower housing of the connecting rod, FIG. 7C is a perspective view showing a first sliding body of the connecting rod, FIG. 7D is a perspective view showing a second sliding body of the connecting rod, and FIG. 7E is a perspective view showing the actuator of the connecting rod;

FIG. 34A is a view showing the connecting rod before a folding operation, and FIG. 34B is a view showing the connecting rod after a folding operation.

DETAILED DESCRIPTION OF THE INVENTION

Figure 1:
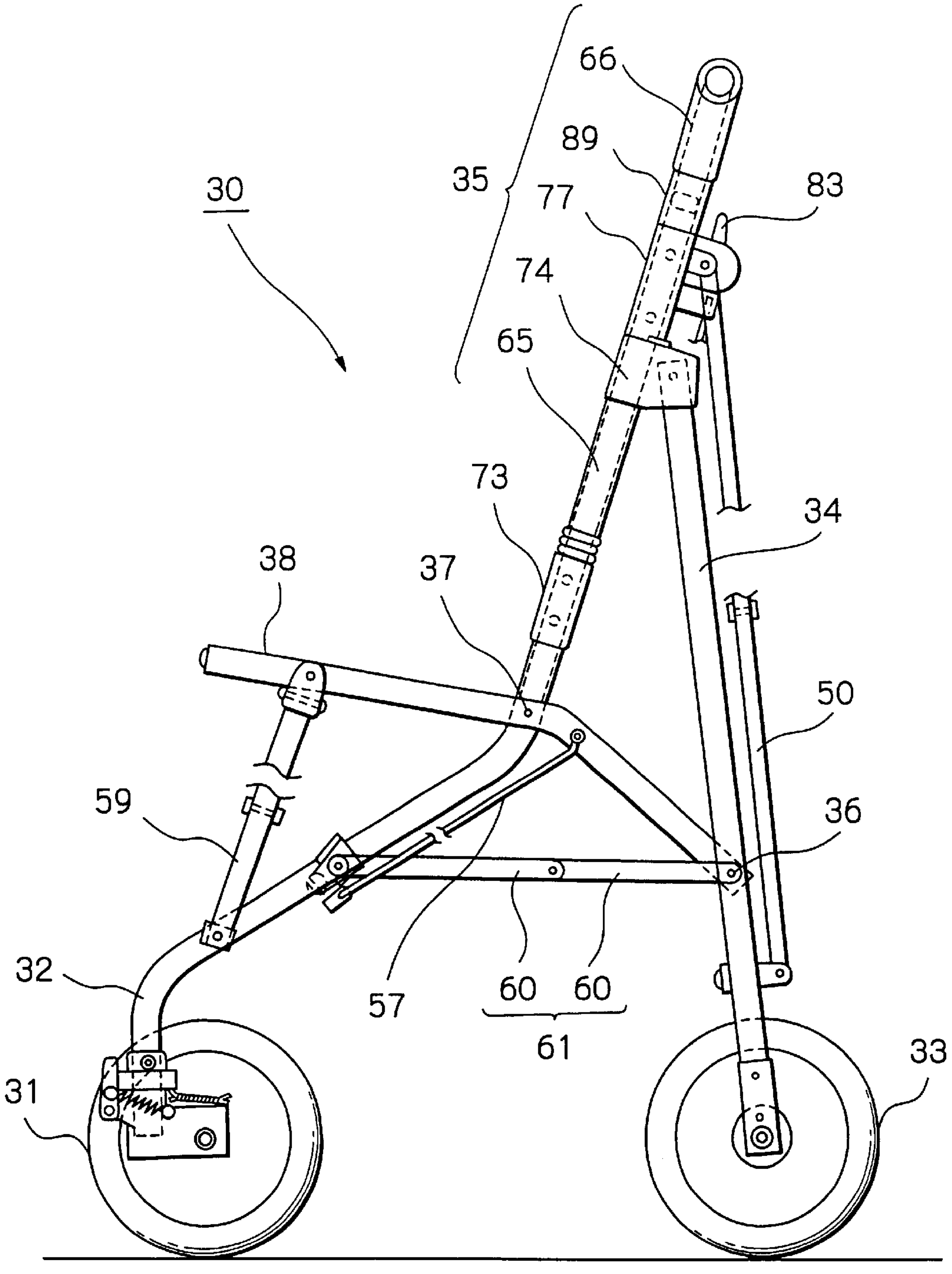
FIG. 1 is a side view showing an expanded state of the embodiment of the present invention.

The embodiments of the present invention will be described with reference to the attached drawings hereinafter. The present invention relates to an improvement of the structure as described with reference to FIGS. 29 to 34. FIGS. 1 to 5 show a specific structure of the walker 30 according to the present invention. The structure of the walker of the present invention is substantially symmetrical from the front side and the rear side, and, therefore, the structure viewed only from one side will be described hereinafter except for necessary situations. In order to clarify the difference between the front side view and the rear side view, the left side of the center line in FIG. 3 shows the structure of the walker of the present invention viewed from the front side, while the right side shows the structure of the walker viewed from the rear side. Although the present invention will be described with respect to a walker for the aged hereinafter, it will be apparent to those skilled in the art that the present invention may also be applied to a baby walker.

The walker 30 of the present invention includes a left and right pair of front legs 32 having front wheels 31 at the lower end thereof, a left and right pair of rear legs 34 having rear wheels 33 at the lower end thereof, a push rod 35 having an approximately U-letter shaped formation which connects the upper portions of the pair of front legs 32, and a left-to-right pair of seat rods 38 having rear ends which pivot on the rear legs 34 by a pivot pin 36 at one side of the rear legs, respectively. The intermediate portions of each of the pair of seat rods 38 are pivoted on a side of the front legs 32, respectively, by a pivot pin 37. A front leg connecting member 41 is composed of a left and right pair of rigid members 40 for connecting the left and right pair of front legs. The outer end of each rigid member 40 pivots on one of the left and right front legs 32, and the inner end of each rigid member 40 is rotatably supported by the pivot pin 39 (see FIG. 3). Similarly, a rear leg connecting member 44 is composed of a left and right pair of rear legs. The outer end of each rigid member 43 is pivoted on the left and right rear legs 34, and the inner end of each rigid member 43 is rotatably supported by a pivot pin 42.

The walker 30 has a pair of open/close rods 50 having lower ends which are pivoted on a lower position of the rear legs 34 at one side of the walker. The upper ends of the open/close rods 50 are pivoted on a raised portion of push rod 35 at the other side of the walker, and the intermediate portions of the open/close rods 50 are rotatably connected with each other through a pivot pin 49 so as to form an X-letter shaped cross. A pair of operation rods 52 have respective outer ends which are rotatably connected to an upper portion (above the pivot means 49) of the open/close rods 50, respectively, and inner ends which are rotatably supported by a pivot member 51.

Moreover, the pivot member 51 is provided with a holding member 53 projecting, for example, in a rearward direction and having an L-letter shape section. The holding member 53 is connected to an upper end of an interlocking member 54 made of a flexible material such as a belt, and a lower end of the interlocking member 54 is connected to the mounting part 55 connected to the pivot pin 42 of the rear leg connecting member 44. If the holding member 53 is moved upwardly, the inner end of each of the pair of operation rods 52 moves upwardly and, simultaneously, the pivot pin 42 of the rear leg connecting member 44 also moves upwardly. However, in the case where the left and right pair of rigid members 43 composing the rear leg connecting member 44 are in the opened condition (FIG. 3), if the rear leg connecting member 44 is formed in such a manner that a straight line connecting the left and right points at which the rigid members 43 ate pivoted on the rear legs 34 is always in a lower position than the pivot pin 42 (inner side end) at which the pair of rigid members 43 are rotatably connected, as is similar to the prior art, the mounting part 55 and the interlocking member 54 is not necessary. In this case, if the rear legs 34 are moved near to each other, the rear leg connecting member 44 is surely folded as the central pivot pin 42 moves upwardly.

According to the walker 30 of the present invention, the following tension reinforcement means is provided in order to avoid the shaking or distortion of the walker 30 in the front-to-rear direction and the left-to-right direction. The tension reinforcement means includes a first reinforcement section 57 composed of a first pair of traction rods 56 arranged to form an X-letter shape as is apparent in FIG. 3. Each of the first pair of traction rods has a lower end which pivots on one of the rigid members 40 of the front leg connecting member 41, has an upper end portion which is connected at a position between the pivot pins 36, 37 of the seat rod 38 which is located on the side of the walker opposite the side on which the lower end of the traction rod is connected. A second reinforcement section 59 is composed of a second pair of traction rods 58 which are arranged so as to form an X-letter shape as is apparent in FIG. 3. Each of the second pair of traction rods has a lower end which pivots on a portion of a front leg 32 adjacent to the front wheel 31, has an upper end which pivots on the seat rod 32 at a position between the pivot pin 37 and the end of the seat rod 38 located at a side of the walker opposite the side on which the lower end of the traction rod is connected. Both of the reinforcement sections 57 and 59 are not always necessary, and even if the first reinforcement section 57 is omitted, the shaking or distortion in the left-to-right direction of the walker 30 may be effectively avoided. Both reinforcement sections may be desirable to use in, for example, a baby walker in which it is desirable to avoid lateral shaking during movement, but a single reinforcement section may be sufficient in a walker for the aged.

Moreover, the walker 30 of the present invention has a tension device 61 at both sides composed of a pair of tension rods 60. Each tension rod 60 of each tension device 61 has an inner end rotatably connected to an inner end of the outer tension rod 60 by a pin, and has an outer end which pivots on either the front leg 32 or the rear leg 34, respectively. This achieves a very excellent function for avoiding any shaking or distortion of the walker 30 in the front and rear direction. If the position of the pivot pin pivoting the inner ends of the two tension rods 60 is lower than the line connecting the two pivot pins pivoting the outer ends of the tension rods 60 on the front leg 32 and the rear leg 32, respectively, the inner ends move toward the lower position in the folded condition as shown by numerals 60 and 60 in FIG. 2. On the other hand, if the position of the pivot pin is higher, the inner ends move toward the upper position as shown by numerals 60' and 60' in FIG. 2.

Figure 4:
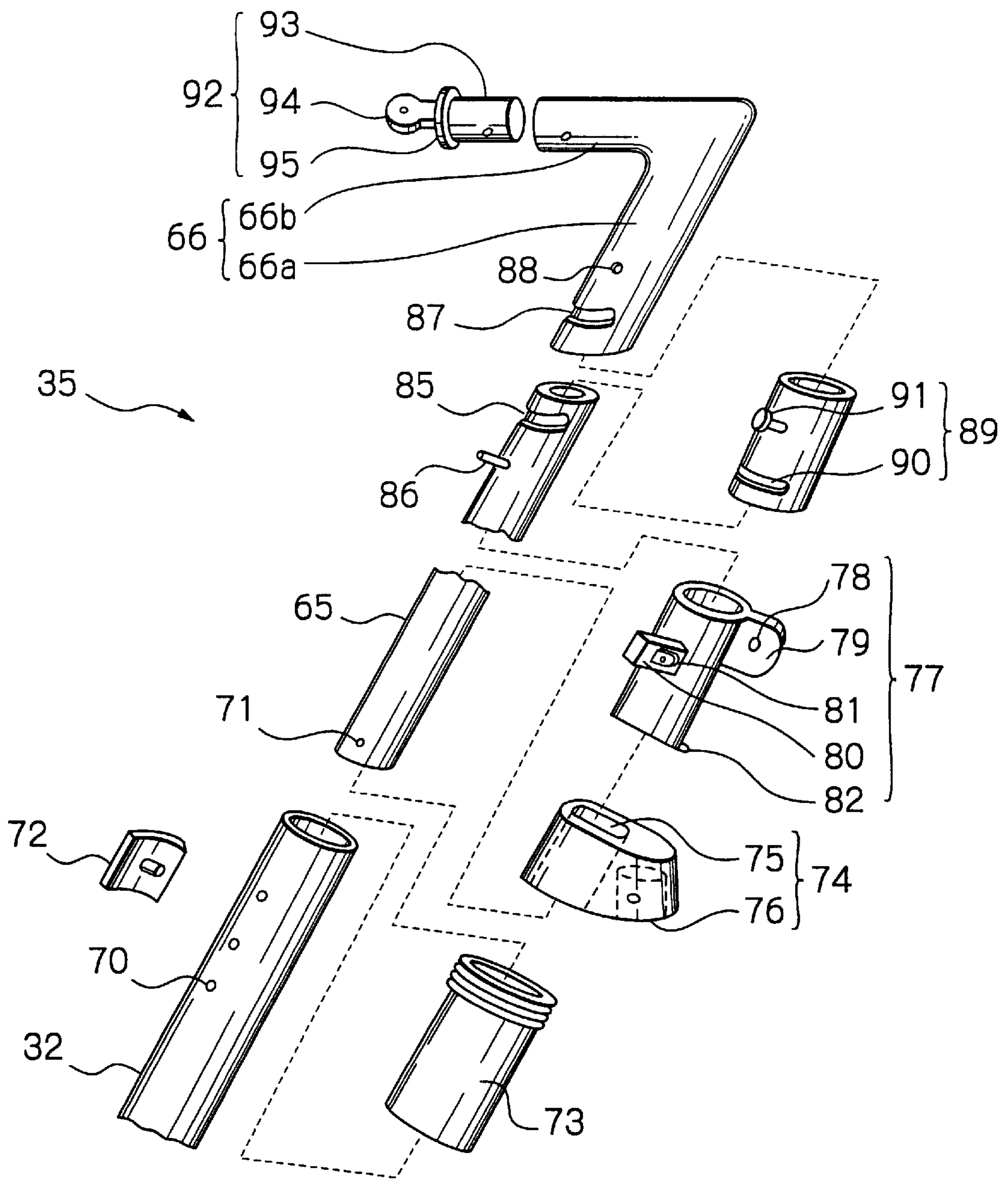
FIG. 4 is an exploded perspective view of the push rod in the embodiment of the present invention.

In general, the push rod 35 has a pair of vertical portions and a lateral portion connecting the upper ends of the vertical portions so as to form an approximately U-letter shape. According to the embodiment shown in FIG. 4, the vertical portions of the push rod 35 are composed of the front legs 32, the left and right pair of lower rods 65 (only one of them is shown in FIG. 4) fitted to the front legs 32, and the longitudinal portions **66*a* of the upper rods 66 which each have a right angle elbow formation and are fitted on the lower rods 65. The lateral portion is composed of the lateral portions 66*b* of the left and right pair of upper rods 66, and the coupling rod 67 (FIG. 6) connecting them. The upper rods 66 are favorably covered entirely by a covering of a soft-touch material such as sponge, rubber or the like (not shown). In this embodiment as shown in FIG. 4, the ends of the lower rod 65 are inserted into the front leg 32 and the upper rod 66, respectively. However, it may also be possible to insert the front leg 32 and the upper rod 66 into the lower rod 65**.

A plurality of holes 70 are provided on the upper portion of the front leg 32 along the axis thereof, and a single hole 71 is provided on the lower portion of the lower rod 65. Alternatively, it may also be possible to provide a plurality holes on the lower rod 65 and a single hole on the front leg 32. The front leg 32 can beg coupled with the lower rod 65 by inserting the pin 72 with a plane into the holes. By selecting one of the holes 70, the height of the push rod 35 can be set at a desired level. The coupled portion between the front leg 32 and the lower rod 65 may be covered by a tubular envelope 73. When it is necessary to change the height of the push rod 35, the envelope 73 can easily be moved upward to change the position of the pin 72.

Moreover, on the lower rod 65 there is provided a slider member 74 having a through hole 75 for slidably receiving the lower rod 65 and a blind hole 76 for receiving the upper end of the rear leg 34. The upper end of the rear leg 34 received in the blind hole 76 is fixed at the position by using a suitable fixing means such as pin.

Moreover, a tubular fixing member 77 is mounted on the lower rod 65 at a position above the slider member 74 by using a fixing means such as pin. The fixing member 77 has a first flange 79 having a central hole 78 and which extends from the rear side, and has a second flange 80 extending toward the central portion of the walker at a right angle with respect to the first flange 79. The second flange 80 is provided with an auxiliary flange 81 which extends in the same direction as that of the first flange 79 and which has a central hole 78. The tubular fixing member 77 is fixed on the lower rod 65 by using a fixing means such as a pin. A contact section 82 is provided on the fixing member 77 at its lower end portion so that the slider member 74 can not move upwardly because of the contact with the contact section 82. The fixing member 77 is formed in this embodiment as being an integral tubular body, however it may also be a type in which two separate pieces envelope the periphery of the lower rod 65. Moreover, the first flange 79 may be provided on at least one of the right and left fixing members 77 (i.e., it does not need to be provided on both).

As shown in FIG. 3, an operation lever 83 for actuating an immobilizing unit (not shown) which stops the rear wheels 33 simultaneously is mounted on the first flange 79 of the fixing member 77, and a flexible cord 84 is provided from the operation lever 83 to the stop device mentioned in detail hereinafter, thereby enabling the actuation of the stop device by operating the operation lever 83. Thus, it is sufficient to mount the first flange 79 on only one of the left side and right side fixing members 77. The upper end of each open/close rod 50 pivots on the auxiliary flange 81 as shown in FIG. 3.

Figure 5A:
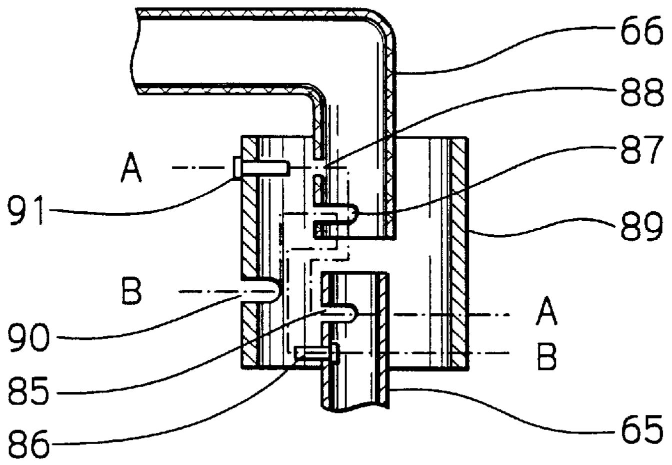
Figure 5B:
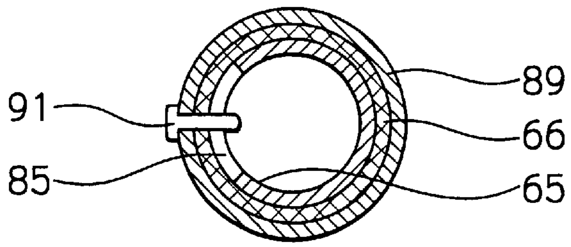
Figure 5C:
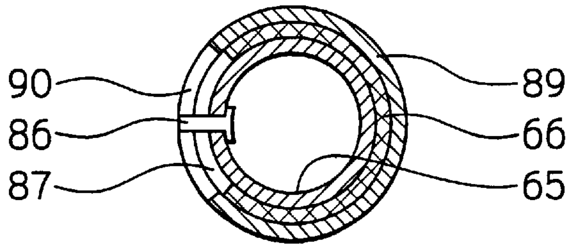

A long slit 85 extends over an angle of about 90 degrees on the upper end circumference of the lower rod 65, and a pin 86 projects from the circumference lower rod 65 at a position lower than the long slit 85. Similarly, a long slit 87 extends over an angle of about 90 degrees on the circumference of upper rod 66 at a lower end. The upper rod 66 receives the upper end of the lower rod 65, and a hole 88 is provided above the long slit 87. A tubular body 89 encloses the coupled portion between the lower rod 65 and the upper rod 66, and the tubular body 89 has a long slit 90 extending over an angle of about 90 degrees on the lower end circumference of tubular body 89. A pin 91 projects from the tubular body 89 at a position above the long slit 90. In FIG. 5A, the tubular body 89 is shown in an enlarged dimension to clarify the relationship among the lower rod 65, the upper rod 66, and the tubular body 89. As shown in FIG. 5B, the pin 91 of the tubular body 89 is inserted into the long slit 85 of the lower rod 65 through the hole 88 of the upper rod 66 after the lower rod 65 is inserted into upper rod 66. On the other hand, the pin 86 of the lower rod 65 is inserted into the long slit 90 of the tubular body 89 through the long slit 87 of the upper rod 66 as shown in FIG. 5C. Thus, FIG. 5B is a view taken along the line A—A in FIG. 5A, and FIG. 5C is a view taken along the line B—B in FIG. 5A. As is apparent from the drawings, if the upper rod 66 rotates toward the front side of the walker about 90 degrees as shown in FIG. 2, the pin 91 inserted into the hole 88 of the upper rod 66 makes the tubular body 89 rotate about 90 degrees simultaneously. At this time, the pin 86 of the lower rod 65 is free to move within the long slit 90 of the tubular body 89. Therefore, the lower rod 65 is not rotated so that the upper rod 66 can be rotated about 90 degrees without affecting the lower rod 65.

A first end 93 of the connecting rod 92 is inserted into the upper horizontal portion of the upper rod 66, and is fixed at that position by using a fixing means such as a pin. A cam 94 having a central hole is formed at the second end of the connection rod 92, and the cam 94 is connected to the coupling rod 67 through the central hole. A flange 95 is formed between the first end 93 of the connection rod 92 and the cam 94.

As shown in FIGS. 6A–6D and 7A–7E, the coupling rod 67 (FIGS. 3 and 6A) is composed of, in general, an upper housing 100, a lower housing 101, a first sliding body 102, a second sliding body 103, and an actuator body 104 for actuating these sliding bodies.

The upper housing 100 has an elongated frm, and holes 105 are provided at each end of the upper housing 100. A circular portion 107 having a central opening 106 is provided at the center of the upper housing 100. On the circular portion 107, there is provided an arc-shaped groove 108 extending over an angle of about 90 degrees with respect to the central opening 106.

The lower housing 101 has an elongated form and holes 109 are provided at each end of the lower housing 101. A circular portion 110 is provided at the center of the lower housing 101. Moreover, raised portions 111*a,* 111*b* are provided along the longitudinal direction at both ends of the lower housing 101.

The first sliding body 102 has an elongated form, and a thin long slit 112 is provided at the central portion. An actuator receiving portion 113 and a cam receiving portion 114 are vertically at the ends of the first sliding body 102, respectively. The second sliding body 103 has an elongated form, and a thin long (strip) piece 115 is provided at the central portion thereof. An actuator receiving portion 116 and a cam receiving portion 117 rise vertically raised at the ends of the second sliding body 103, respectively. The thin long (strip) piece 115 is slidably received within the thin long slit 112 of the first sliding body 102. In the figure, numeral 118 denotes a stop piece.

The actuator body 104 is disposed within a space between the actuator receiving portion 113 of the first sliding body 102 and the actuator receiving portion 116 of the second sliding body 103. The actuator body 104 includes an operation portion 119, which directly actuates these actuator receiving portions, and an actuator portion 120 for actuating the operation portion 119, and the operation portion 119 and actuator portion 120 are formed integrally. As is apparent from FIG. 6B, pins 121 and 121 extend through the holes 105 and 105 of the upper housing 100, the cams 94 and 94 of the connecting rods 92 and 92, and the holes 109 and 109 of the lower housing 101, respectively. The first sliding body 102 and the second sliding body 103, which is freely slidable in the left and right directions within the slit 112 of the first sliding body 102, are slidably received in the pair of raised portions 111*a,* 111*b* of the lower housing 101. The ends of a spring 121*a* are disposed in respective holes in the actuator receiving portions so that the actuator receiving portion 113 is drawn toward the actuator receiving portion 116.

The operation portion 119 of the actuator body 104 is arranged between the actuator receiving portions 113 and 116 against the resilient force of the spring 121*a*. When the spring 121*a* is located at a position such that the actuator receiving portions 113 and 116 are adjacent to each other (FIG. 6B and 6C), the cam receiving portion 114 of the first sliding body 102 is in the farthest position from the cam receiving portion 117 of the sliding body 103. The cam receiving portions 114 and 117 are fitted in the recesses 122 and 122 on the cams 94 and 94, respectively. The recess 122 is formed on the axial line of the connecting rod 92. Therefore, when the cam receiving portions 114 and 117 are fitted in the recess 122, the left and right connection rods 92 are held on a straight line, and the push rod 35 is formed in a complete U-letter shape so as to maintain the expanded condition of the walker 30. At that time, the cam bias portion 126 projecting from a part of the generally circular cam 94 contacts the contact portion 127 (FIG. 7B) at both ends of the raised portion 111*a* of the lower housing 101. Thus, the further rotation of the pair of connecting rods 92 is prevented.

A knob 124 (FIG. 6B) is fixed on the actuator body 104 by using a screw 123 and is fitted to the actuator portion 120 of the actuator body 104. The knob 124 has a projection 125 at its bottom, and the projection 125 is fitted into the circular groove 108 of the upper housing 100 in order to limit the rotation angle of the knob 124.

Figure 6A:
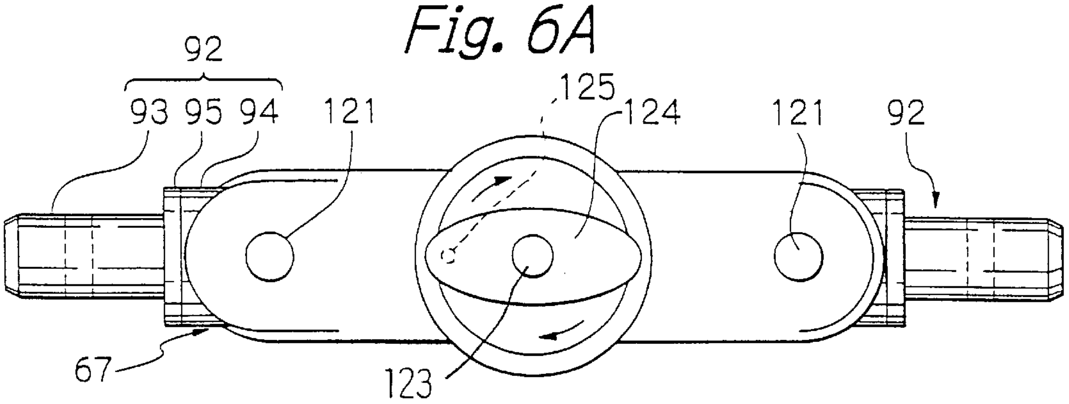
Figure 6B:
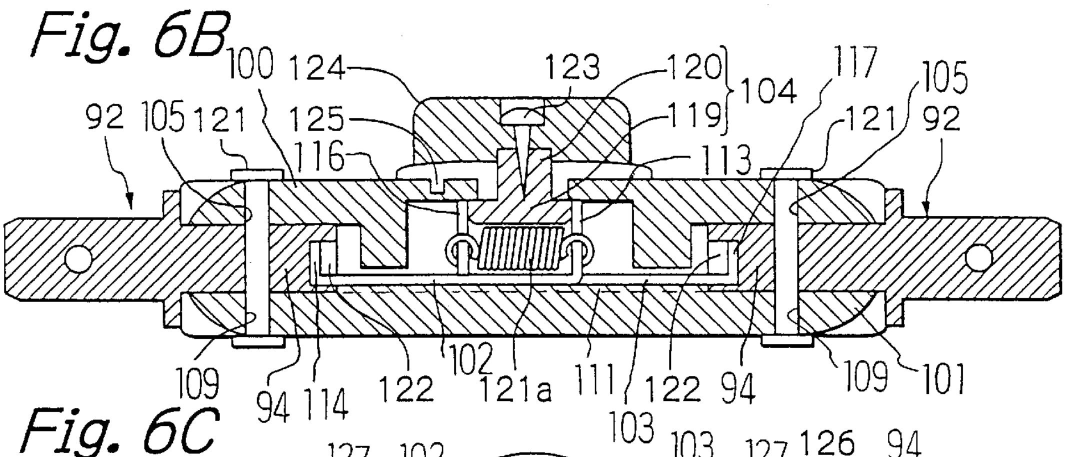
Figure 6C:
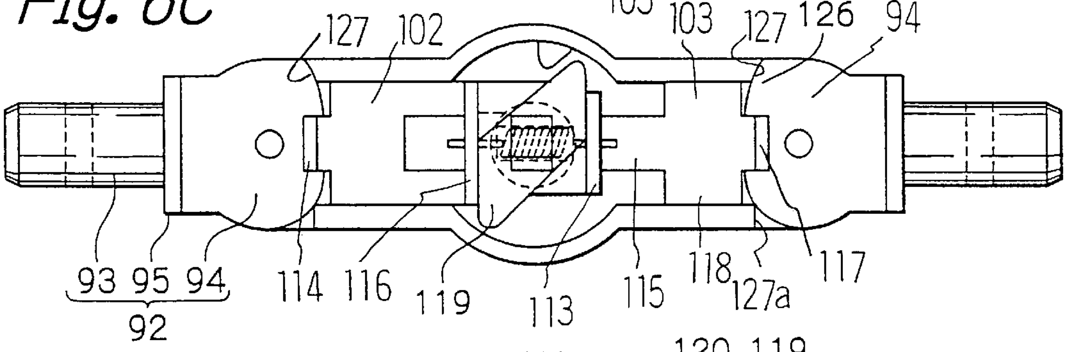
Figure 6D:
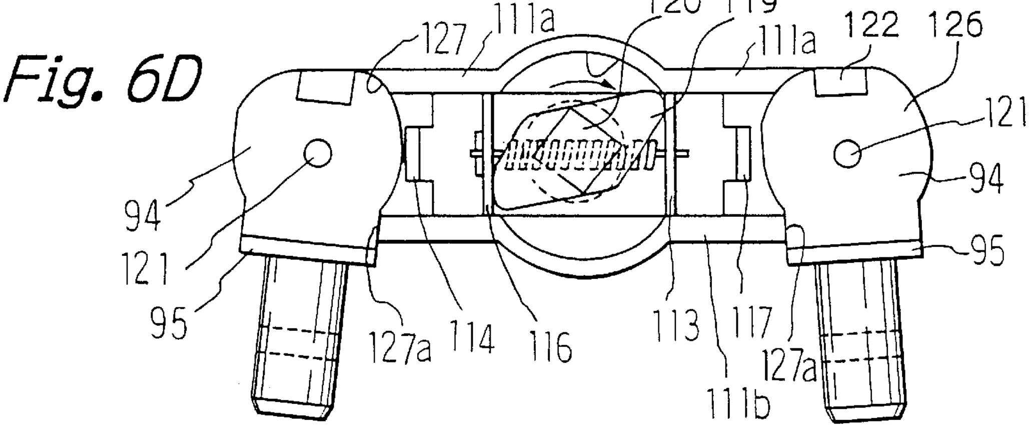
Figure 7A:
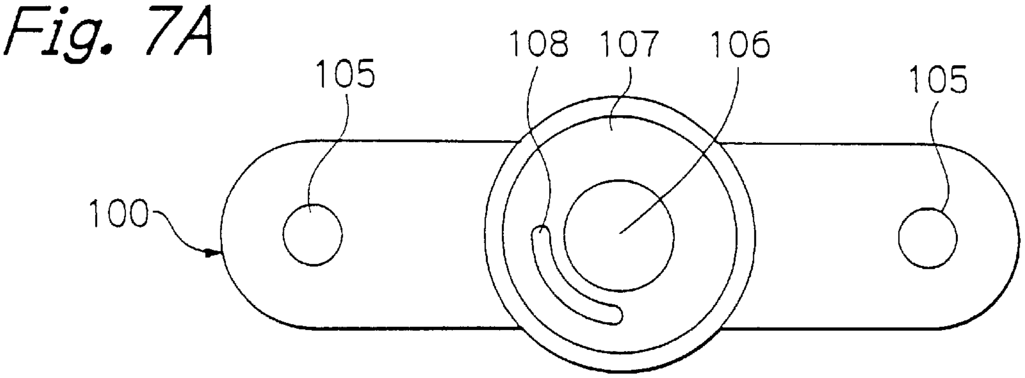
Figure 7B:
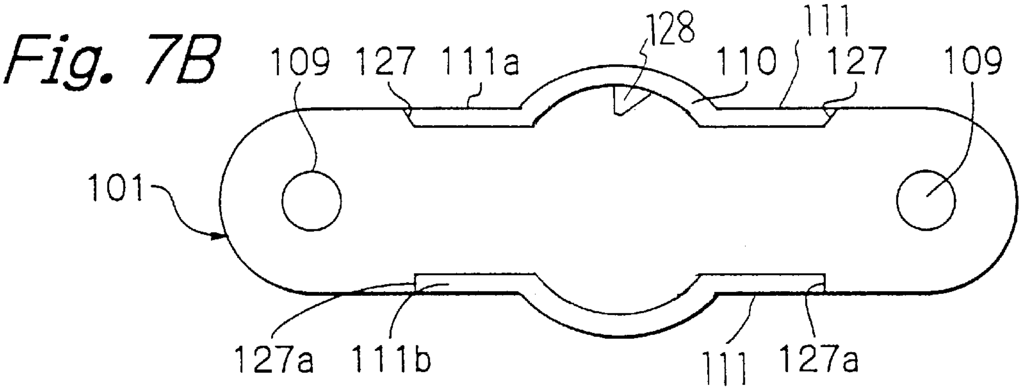
Figure 7C:
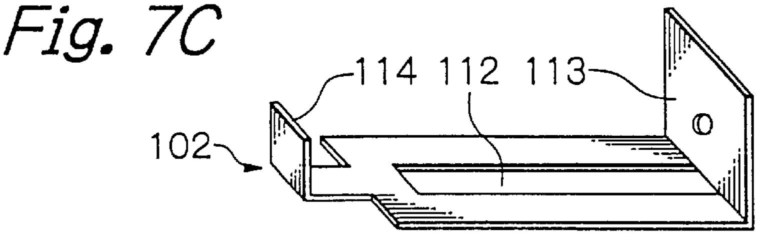
Figure 7D:
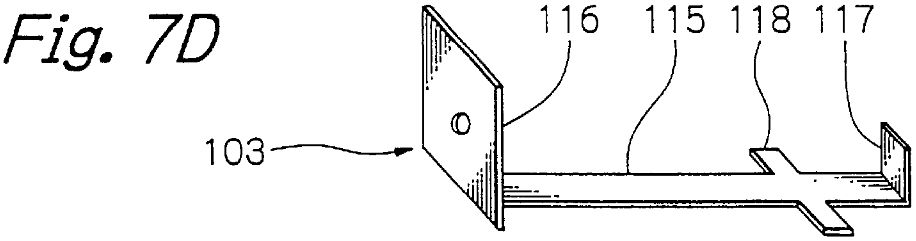
Figure 7E:
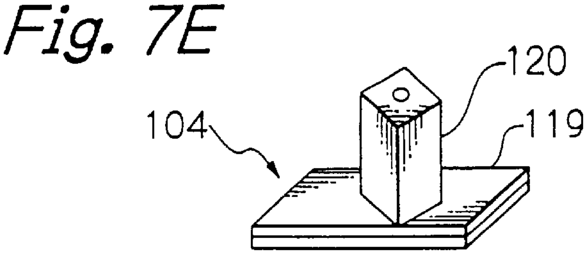

If the knob 124 is rotated in the arrow direction as shown in FIG. 6A, the actuator body 104 rotates from the position as shown in FIG. 6C to the position as shown in FIG. 6D. Therefore, the actuator receiving portions 113 and 117 of the sliding bodies 102 and 103 are separated against the resilient force of the spring 121*a*. As a result, the cam receiving portions 114 and 117 of the sliding bodies 102 and 103 slide closer to each other and they are retracted from the recesses 122. Therefore, the connection rods 92 maintaining the straight line are released so as to be freely rotatable around the pins 121, respectively, in a direction in which cam portions 126 of the cams are moved apart from the contact portion 127 (i.e., a direction in which the coupling rod 67 moves upwardly along this paper in FIGS. 6A and 6C). In this condition, if the coupling rod 67 is completely moved, the cams 94 of the connecting rods 92 rotate around the pins 121 respectively so as to complete the folding operation of the push rod. At this time, the portions adjacent to the flanges 95 of the cams 94 contact the contact portions 127*a* at both ends on the other raised portion 111*b*, respectively, so as to prevent further movement of the coupling rod 67.

Referring now to the folding operation of the walker of the present invention, the knob 124 of the coupling rod 67 is first rotated clockwise as shown in FIG. 6A. Then the holding member 53 of the pivot member 51 is moved from the expansion locking position of FIG. 3 (i.e., the position in which the line connecting the pivot points between the open/close rods 50 and the operation rod 52 is located lower than the pivot member 51 on which the operation rods 52 are pivoted) to the upper position, and the position of the pivot member 51 for the operation rods 52 is moved upwardly. By this operation, the operation rods 52 rotate the open/close rods 50 with an X-letter arrangement around the pivoting means 49 so as to make the portions of the left and right rear legs 34 and the left and right lower rods 65 of the push rod 35 approach each other, respectively. The mounting part 55 (the mounting part 55 is sometimes connected to the holding member 53 by a flexible interlocking member 54 such as belt) moves upwardly simultaneously, and the pivot pin 42 of the rear leg connecting member 44 is also moved upwardly so as to make the lower portions of the left and right rear legs 34 approach each other.

The coupling rod 67 is then pushed to the front side, and the upper rods 66 of the push rod 35 are rotated around the lower rods 65. As a result, the upper rods 66 and the tubular bodies 89 are rotated with respect to the lower rods 65. By this, the push rods 35 are folded and, simultaneously, the front legs 32 are moved to be adjacent to each other at the center portion of the walker. Furthermore, as the front legs 32 become near to each other, the second pair of traction rods 58 arranged to have an X-letter shape are raised, and the ends of the seat rods 38 are also raised so as to raise the first pair of traction rods 56 and push the rigid members 40 downwardly.

Furthermore, as the ends of the seat rods 38 are raised, the front legs 32 approach the rear legs 34. At that time, the position at which the respective inner ends of the two tension rods 60 are pivoted is always positioned at a lower level than the line connecting the two pivot pins on which the front legs 32 and the rear legs 34 are pivoted on the tension rods 60, respectively. Therefore, the position at which the respective inner ends of the two tension rods 60 are pivoted moves downward so as to enable the front legs 32 and the rear legs 34 to approach each other. Thus, the walker 30 can be quickly folded as shown in FIG. 2.

Figure 2:
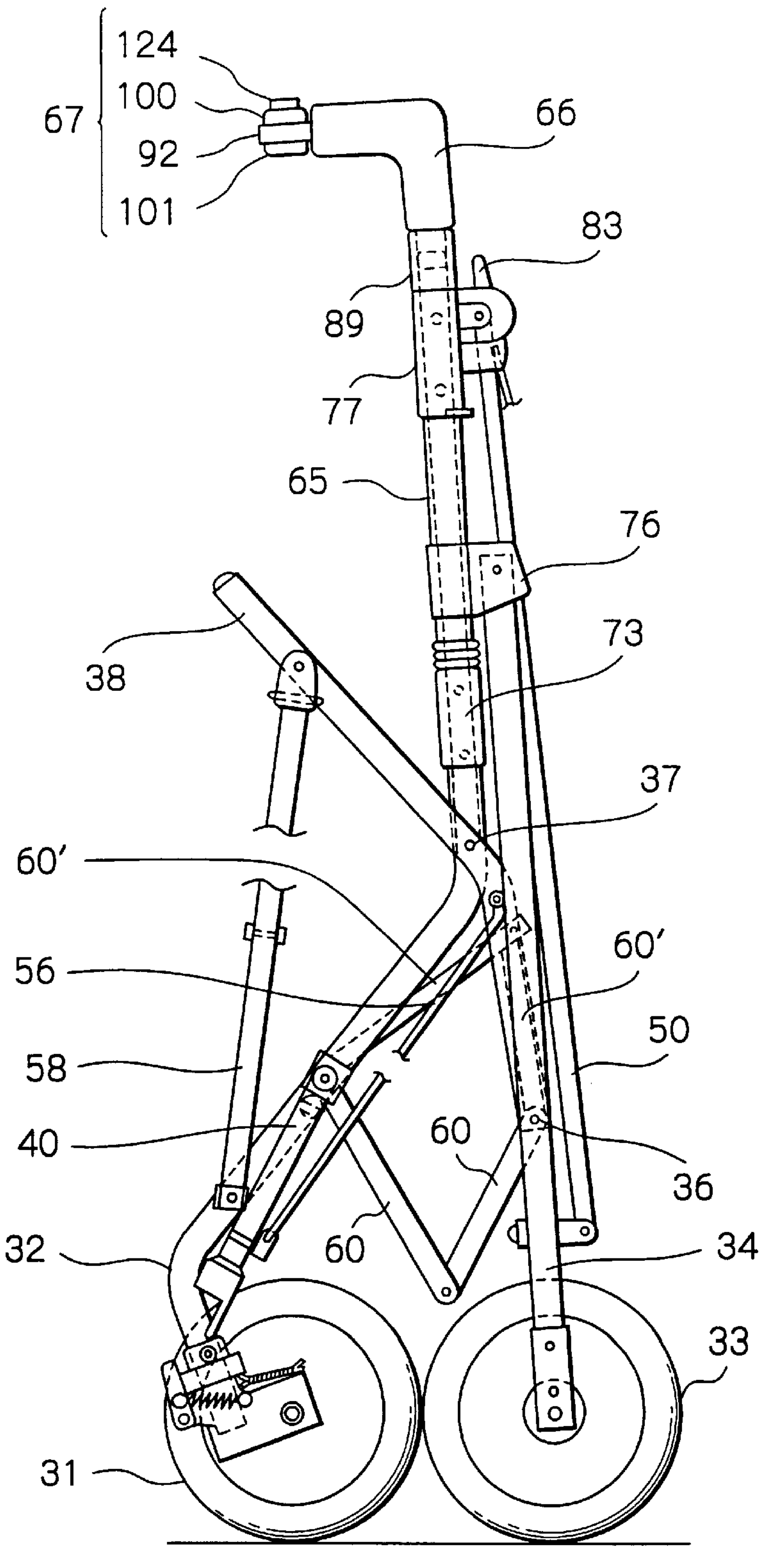
FIG. 2 is a side view showing a folded state of the embodiment of the present invention.
Figure 3:
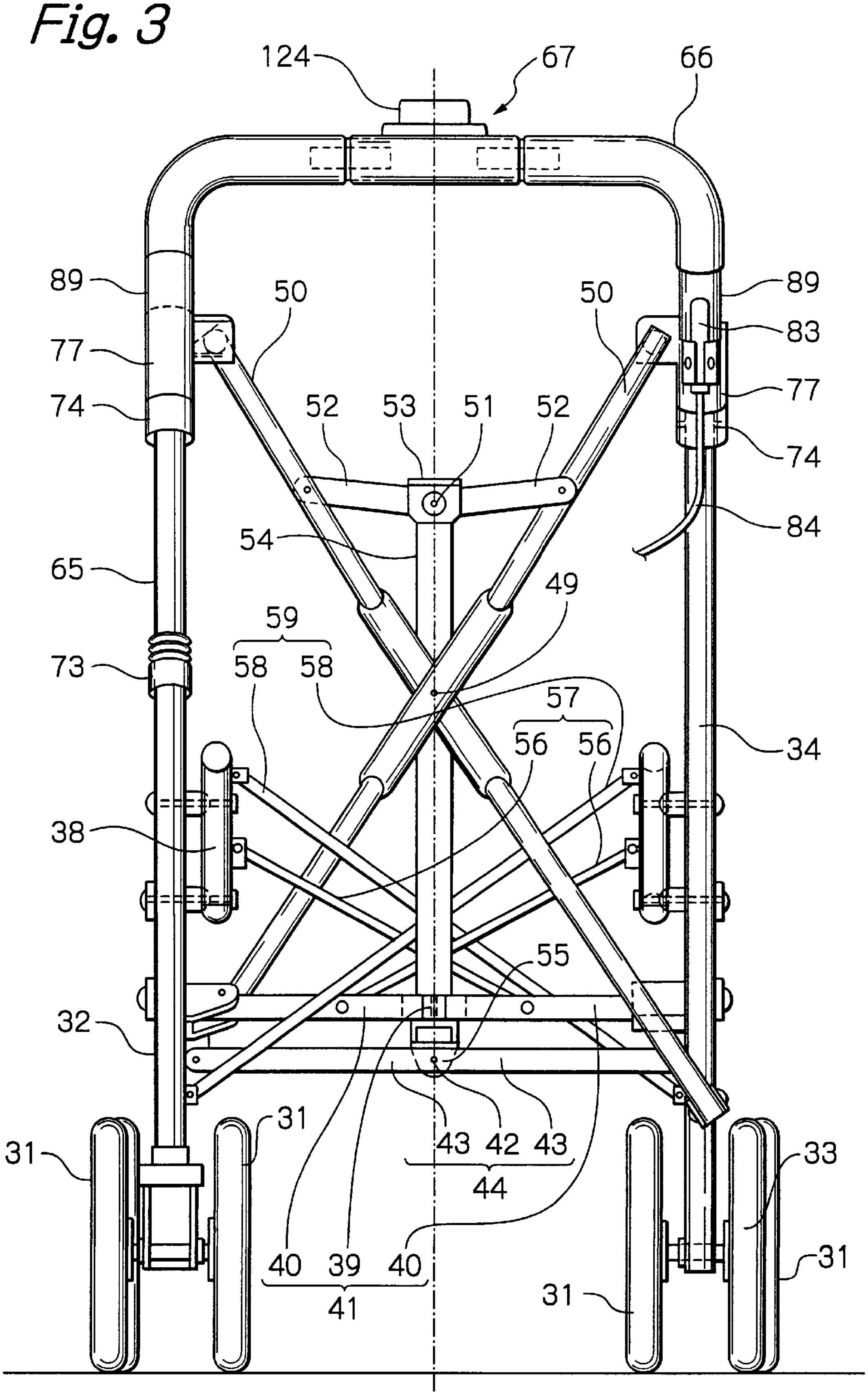
FIG. 3 is a split view showing an expanded state of the embodiment of the present invention, in which the left half of the figure is a view from the front of the walker and the right half of the figure is a view from the rear of the walker.

The operator may easily change the condition of the walker 30 from the folded condition as shown in FIG. 2 to the expanded (i.e., opened) condition as shown in FIG. 1 by performing the above steps in reverse. Namely, at first the upper rods 66 of the push rods 35 are rotated around the lower rods 65 in a rearward direction. By this, the open/close rods 50, the front leg connecting member 41, the rear leg connecting member 44, the seat rods 38, the first pair of traction rods 56, the second pair of traction rods 58, the tension device 61, the operation rods 52 are all operated in a reverse direction so as to quickly achieve the expanded condition of the walker of the present invention. After the completion of the expansion thereof, the cam 94 fits on the cam receiving portion so as to lock it by operating the knob 124.

The slider member 74 in the embodiment is adapted to be slidable along the lower rod 65 of the push rod 35, but it may also be possible that the front legs 32 are extended upwardly and the front leg portions may be made slidable.

Moreover, the operation of the coupling rod 65 upon the folded condition may easily be achieved by changing the relationship of the long slits as shown in FIG. 4 and the relationship between the cams 94 and the raised portions 111*a*, 111*b* as shown in FIGS. 6 and 7 by simply pulling it rearwardly.

The immobilizing unit will be described hereinafter.

According to the present invention it is possible to provide a known frictional brake device (not shown) using a frictional contact plate for braking the walker in addition to the immobilizing unit.

Next, the embodiment of the immobilizing unit 130 of the present invention will be described hereinafter. It should be understood that although the embodiment is described with respect to a walker for the aged, the present invention should not be limited to this example, and can also be applicable to, for example, a baby walker or a nursing walker. The mounting position for they operation mechanism is not limited to the push rod as mentioned below, but may also be mounted on the rod members, the arm rods or the like which form the seat so that a user sitting down on the seat can operate the operation mechanism while on the seat.

Figure 8:
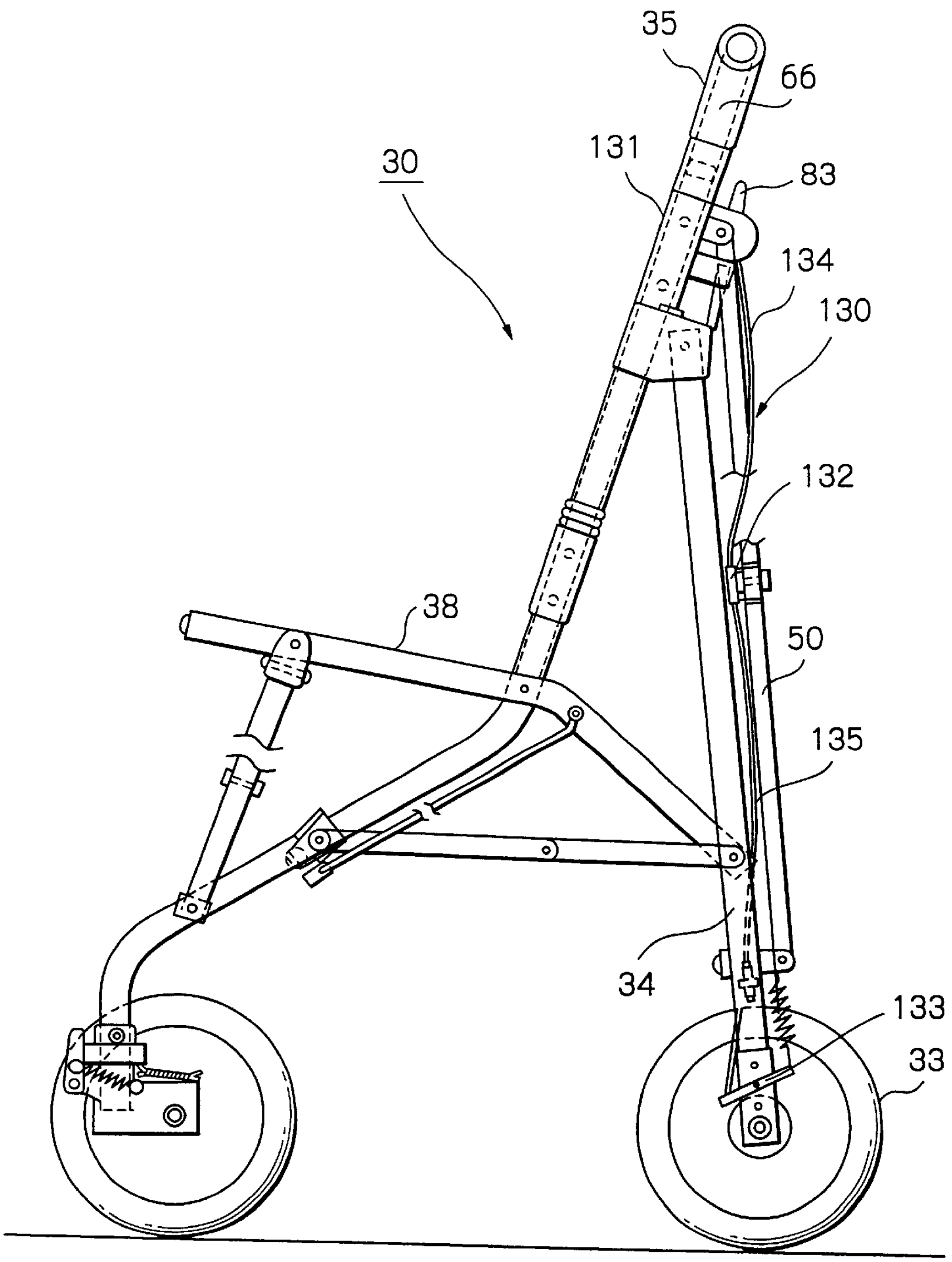
FIG. 8 is a side view showing the walker for the aged provided with a immobilizing device.
Figure 9:
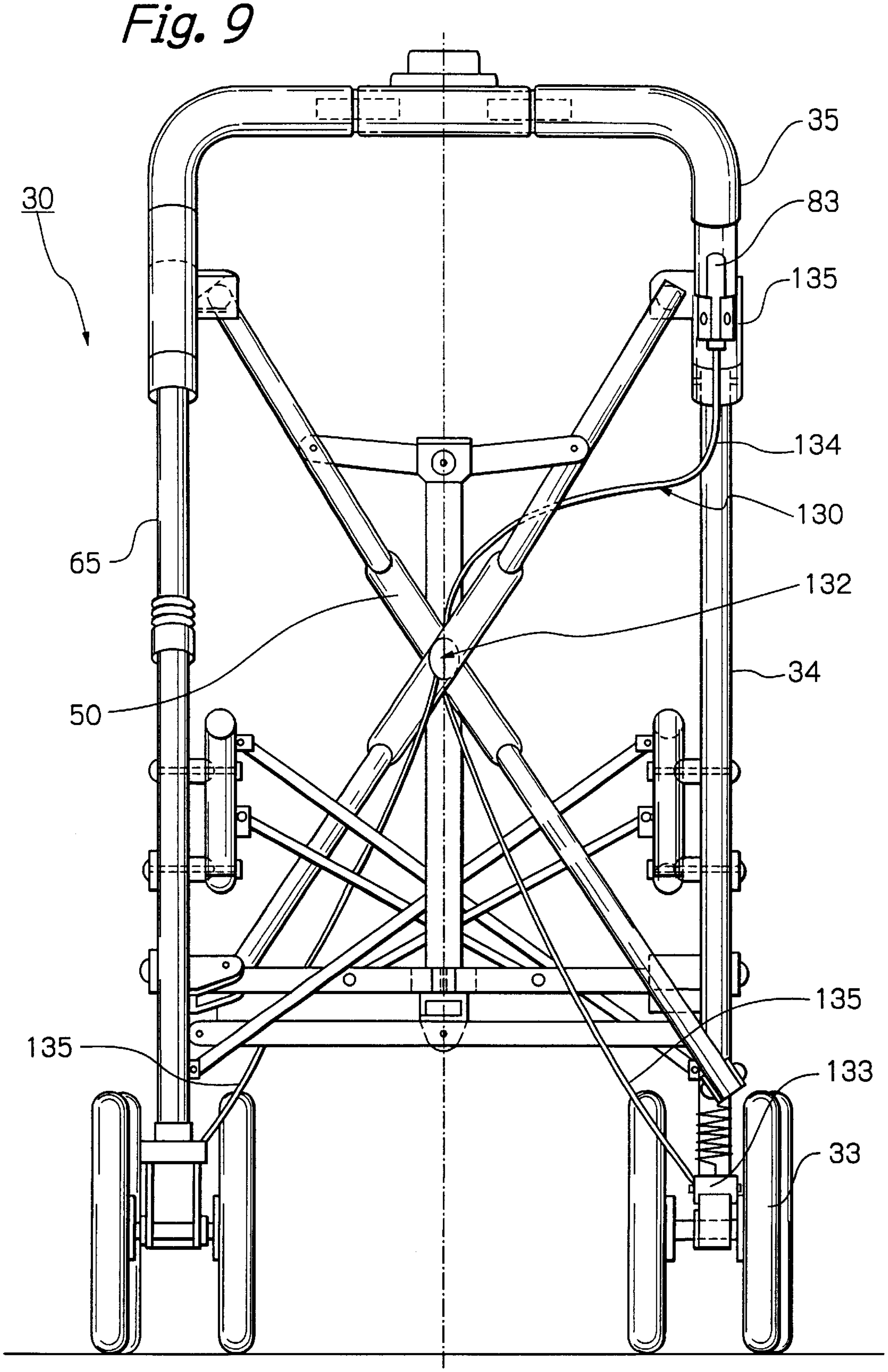
FIG. 9 is a split view showing the walker for the aged in FIG. 8, wherein the left half of FIG. 9 is a front view of the walker, and the right half of FIG. 9 is a rear view of the walker.
Figure 10:
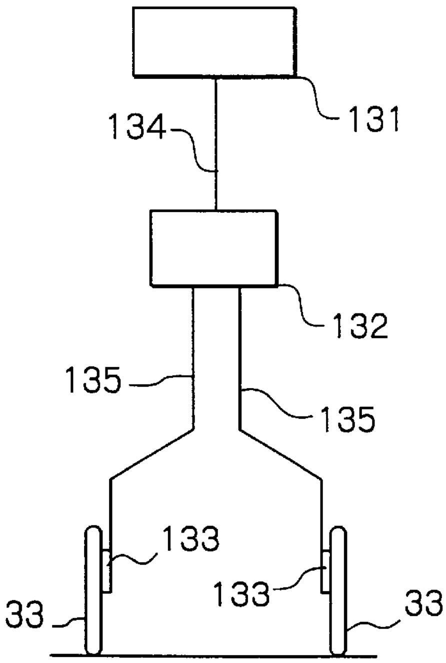
FIG. 10 is a conceptual view showing one embodiment of the immobilizing device of the present invention.

FIG. 8 is a side view showing the walker 30 for the aged provided with the immobilizing unit 130 of the present invention, and FIG. 9 is a view showing the walker for the aged in FIG. 8. The left half of FIG. 9 shows a view from the front side, and the right half of FIG. 9 shows a view from the rear side. FIG. 10 is a conceptual view of the immobilizing unit 130 of the present invention.

In FIG. 10, numeral 131 denotes an operation mechanism. The operation mechanism 131 may be composed of members similar to those of tubular fixing member 77 in FIG. 4. Numeral 132 denotes a force diverging mechanism, and numeral 133 denotes an immobilizing device for stopping the rear wheels 33. The operation mechanism 131 is connected to the force diverging mechanism 132 through a single first force transmission mechanism 134, and the force diverging mechanism 132 is connected to the immobilizing device 133 through a pair of second force transmission mechanisms 135 and 135, respectively. Therefore, the force transmission mechanisms 134, 135 and 135 correspond to the member denoted by cord 84 in FIG. 3. It is preferable that the force transmission mechanisms 134, 135 and 135 comprise a bundle of thin flexible wire cords and a cover tube (not shown), similar to the wire cord used for, the brake device of a motorcycle or the like. Both ends of the cover tube are provided with metallic screw parts (not shown). The metallic screw parts are screwed to the operation mechanism 131 (substantially corresponding to the opening 151 of the operation lever holding flange 150 mentioned later in FIG. 12), the force diverging mechanism 132 (substantially corresponding to the opening 162 of the force diverging case 155 mentioned later in FIG. 16), the force diverging mechanism 132 (substantially corresponding to the openings 163, 163 of the force diverging case 155 mentioned later in FIG. 16), and the immobilizing device 133 (substantially corresponding to the immobilizing member 193 fixed on the rear legs 34 mentioned later in FIG. 25), respectively. The distance between each of the mechanisms is restricted, and the flexible wire cord is adapted to be slidable within the cover tube. If it is necessary, the force transmission mechanism may be composed of a single wire with a somewhat large diameter and a cover tube. As a result, according to the present invention, when the user drives the operation mechanism 131, the operation force from the user is transmitted to the force diverging mechanism 132 through the first force transmission mechanism 134, and then the force is divided by the force diverging mechanism 132 and transmitted to the immobilizing device g 133 and 133 through the pair of second force transmission mechanisms 135 and 135 respectively. Therefore, the immobilizing devices 133, 133 stop the wheels 33 and 33, respectively.

Figure 11:
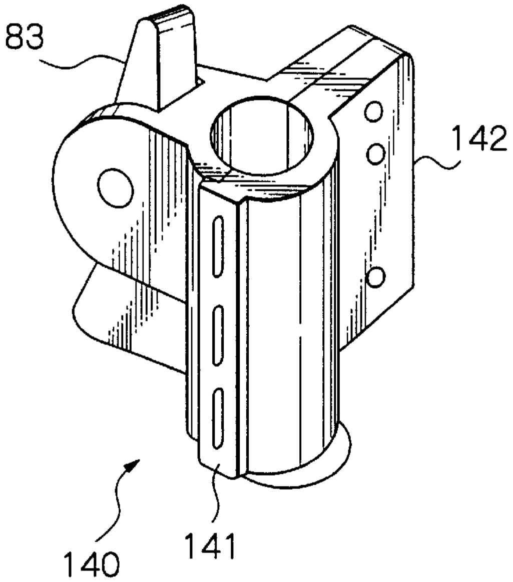
FIG. 11 is a perspective view showing the operation means of the immobilizing unit of the present invention.
Figure 12:
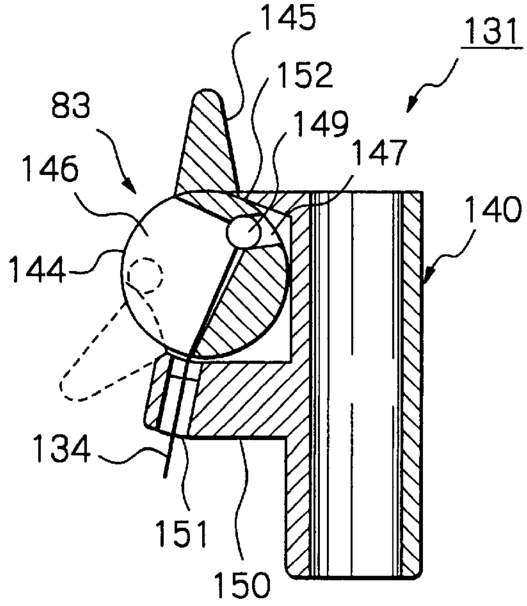
FIG. 12 is a sectional view showing the operation means of the immobilizing device of the present invention.
Figure 13:
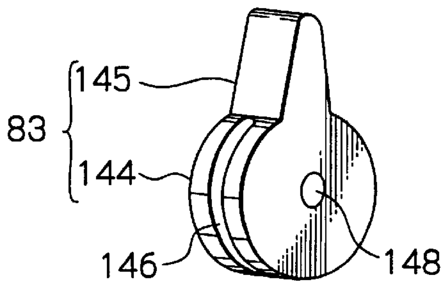
FIG. 13 is a perspective view showing the operation lever of the operation means of FIG. 11.
Figure 14:
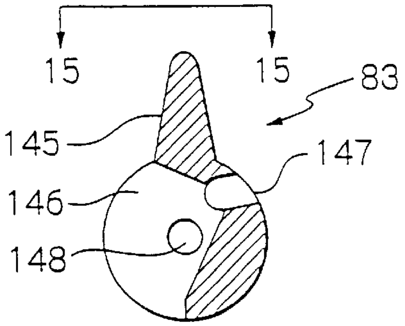
FIG. 14 is a sectional view showing the inner side of the operation lever.
Figure 15:
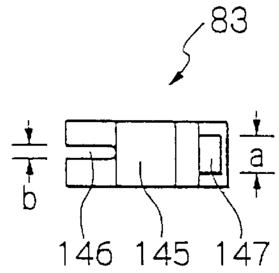
FIG. 15 is a view taken along the line 15—15 in FIG. 14.

FIGS. 11 to 15 show the embodiment of the operation mechanism 131. In FIG. 11, numeral 140 denotes the fixing member mounted on the push rod 35 of the walker 30 for the aged. The fixing member 140 may be made of synthetic resin and may be two-piece type for easily enabling the mounting operation to the push rod. Therefore, a first end 141 and a second end 142 are coupled together, and the second end 142 is fixed by screws. An operation lever 83 is rotatably mounted on the fixing member 140 as shown in FIGS. 11 and 12. The operation lever 83 has a circular rotation portion 144 and an operation portion 145 which projects outwardly in the radial direction from the periphery of the rotation portion 144 as shown in FIG. 13. A groove 146 is provided in the center of the periphery of the rotation portion 144 with respect to the direction of thickness. The groove 146 has an opening extending over an angle of about 90 degrees around the center of the periphery and a straight hole 147 is provided at the deepest portion of the groove 146 as shown in FIG. 14. FIG. 15 is a view showing the operation lever 83 viewed along the line 15—15 in FIG. 14. The dimension a in the thickness direction of the straight hole 147 is set larger than the dimension b in the thickness direction of the groove 146. A blind opening 148 is provided at the center of the rotation portion 144, and a short shaft is inserted into the opening 148 so as to rotatably support the operation lever 83 on the fixing member 140. At that time, the short shaft is adapted not to be inserted into the groove 146. As is apparent to those skilled in the art, in place of providing the opening 148 for inserting the short shaft, a column shaped projection at both sides of the center of the rotation portion 144 of the operation lever 83 may also be provided as the pivoting means for rotatably supporting the operation lever 83 on the fixing member 140. Then the projections can be inserted into the opening previously provided at a predetermined position in the fixing member 140.

In the straight hole 147, an end holding body 149 for holding the first end of the flexible wire cord composing the first force transmission mechanism 134 is received. The end holding body 149 is a rod with a circular section, and its length is approximately equal to that of the dimension a of the straight hole 147. Therefore, the end holding body 149 does not drop out of the straight hole 147 to the side of the groove 146. Moreover, the straight hole 147 may be covered by a cap so as to avoid dropping out of the end holding body 149. As is shown in FIG. 12, the first force transmission mechanism 134 has a first end which is fixed to the end holding body 149 and extends to the force diverging mechanism 132 through the groove 146 and through the opening 151 in the operation lever holding flange 150 mounted on the fixing member 140. Therefore, if the operation portion 145 is rotated in the counterclockwise direction from the position shown by the solid line in FIG. 12 to the position shown by the dotted line, the first force transmission mechanism 134 transmits the force in the downward direction toward the force diverging mechanism 132.

It is not necessary to mount the operation lever 83 to the fixing member 140 which is to be mounted on the push rod 35. The operation lever 83 may also be mounted at a random position on seat rod 38 so that the user of the walker 30 for the aged may use the operation lever 83 while seated.

Figure 16:
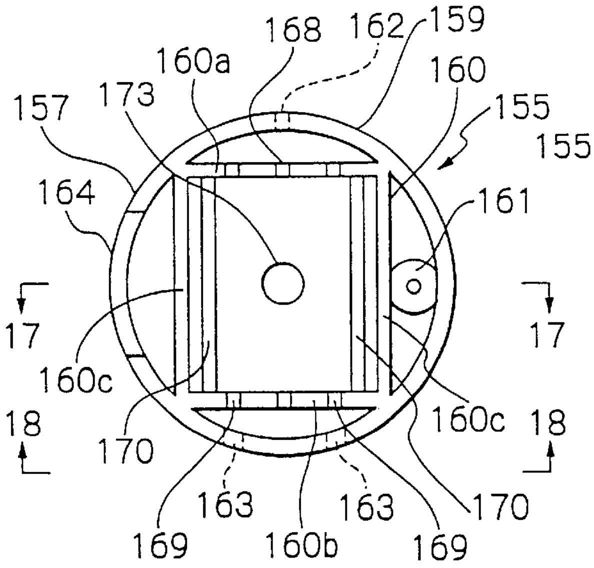
FIG. 16 is a front view showing the force diverging case composing the force diverging means.
Figure 17:
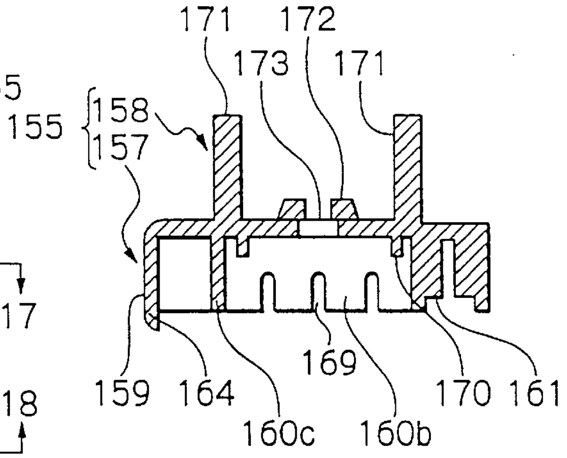
FIG. 17 is a view taken along the line 17—17 in FIG. 16.
Figure 18:
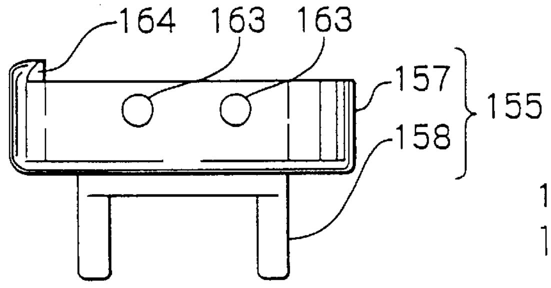
FIG. 18 is a view taken along the line 18—18 in FIG. 16.

FIGS. 16 to 22 show the embodiment of the force diverging mechanism 132 of the present invention. In FIG. 16 showing the front view, numeral 155 denotes a force diverging case composing the force diverging mechanism 132, and FIGS. 17 and 18 are sectional and bottom views showing the force diverging case 155 taken along the line 17—17 in FIG. 16, and the line 18—18 in FIG. 16, respectively. The force diverging case 155 is made of synthetic resin integrally, and has a cylindrical front portion 157 for receiving a sliding piece 156 (FIG. 20) mentioned hereinafter, and has a rear portion 158 with the mounting means for mounting the force diverging case 155 on the walker 30 for the aged, within the force diverging case.

Figure 19:
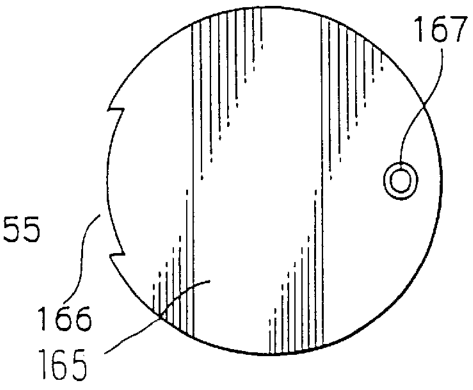
FIG. 19 is a view showing the cover member for the force diverging case.
Figure 22:
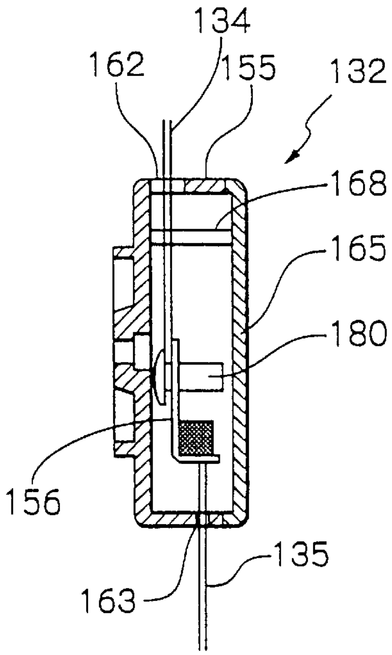
FIG. 22 is a side view showing the structure of the force diverging means.

The cylindrical front portion 157 is composed of a cylindrical raised wall 159 formed at the periphery of the force diverging case 155, a rectangular raised wall 160 mounted on the inner side of the cylindrical front portion 157, and a screw receiving portion 161 mounted between the raised tall 159 and 160. In the raised wall 159, a single opening 162 is formed at the upper portion thereof and a pair of openings 163 and 163 with a predetermined space therebetween are formed at the lower portion thereof as shown in FIG. 16. Furthermore, there is formed an arc shaped projection portion 164 at the left side thereof. The cover member 165 as shown in FIG. 19 is covered on the raised wall 159. The cover member 165 is formed with a notch 166 adapted to be fitted to the projection portion 164 of the raised wall 159 and a screw hole 167 for receiving a screw as a fixing means (not shown). The fixing means (not shown) such as a screw passing through the screw hole 167 is screwed into the screw receiving portion 161 in the cylindrical front portion 157. Therefore, the cover member 165 can cover the force diverging case 155 completely as shown in FIG. 22.

Figure 21:
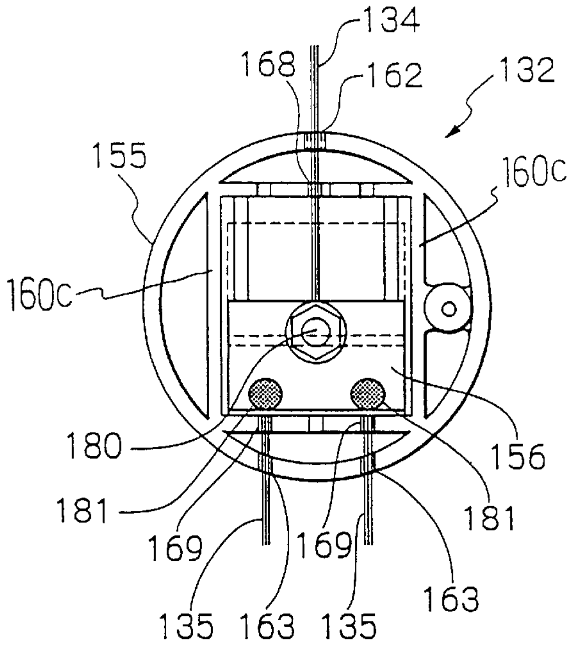
FIG. 21 is a front view showing the structure of the force diverging means.

Moreover, the rectangular raised wall 160 mounted on the cylindrical front portion 157 has notch portions 168 and 169 at the upper portion 160*a* and the lower portion 160*b*, respectively. Thus, as shown in FIGS. 16 and 17, three notches are provided at the upper portion 160*a* and the lower portion 160*b* of the raised wall 160, respectively. It is substantially sufficient to provide a central notch adapted to be aligned with the opening 162 at the upper portion 160*a*, and a pair of notches 169, 169 adapted to be aligned with the openings 163 and 163 at the lower portion 160*b*. Moreover, a sliding piece 156 is disposed between side portions 160*c* and 160*c* of the rectangular raised wall 160 as shown in FIG. 21. In order to perform a smooth sliding operation of the sliding piece between both side portions 160*c* and 160*c*, there are provided a pair of supporting pieces 170 which are slightly raised for supporting the back of the sliding piece 156 in parallel with both side portions 160*c* and 160*c*.

At the rear portion 158 of the force diverging case 155, there is provided a mounting means for mounting the force diverging case 155 on the walker 30 for the aged. The mounting means is composed of a pair of mounting portions 171 and a pair of mounting assist portions 172, and a mounting means such as a bolt (not shown) is passed through the cross portion of the pair of open/close rods 50 arranged to form an X-letter shape of the walker 30 for the aged through a hole 173 formed at the center of the force diverging case 155. The mounting means depends on the mounting position or the mounting member of the walker 30 for the aged. Alternatively, the left and right mounting portions 171 may be formed as a coupled annular formation, and it may be possible to mount a hole for receiving the screw on the left and right mounting portion 171, or adhesive may be used. Moreover, the mounting position is not limited to the cross portion of the open/close rods 50, and any suitable position may be selected. However, it is favorable to select a position at which a change of position does not occur upon folding the walker, and one such position is the cross portion of the open/close rods 50.

Figure 20:
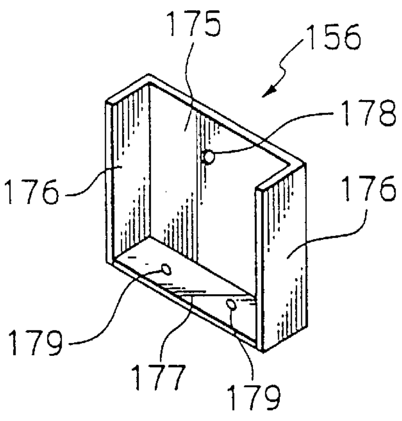
FIG. 20 is a perspective view showing the slider piece sliding within the force diverging case.

FIG. 20 shows the sliding piece 156, and it is desirable to form the sliding piece 156 from a rigid member such as an iron plate. If the sliding piece 156 is deformed, the distances between the operation mechanism 131 and the force diverging mechanism 132, and the force diverging mechanism 132 and the immobilizing device 133 are changed respectively, and therefore a suitable stopping operation could not be expected. The sliding piece 156 is composed of a base portion 175, a pair of guiding portions 176 raised at both sides of the base portion 175, and a force diverging portion 177 positioned at the lower side of the pair of guiding portions 176. A single hole 178 is provided on the upper portion of the base portion 175, and a pair of holes 179 are formed on the force diverging portion 177. The sliding piece 156 is disposed within the rectangular raised portion 160 of the. force diverging case 155, and the back of the base portion 175 is supported by the supporting piece 170 of the force diverging case 155 while the guiding portions 176 and 176 are supported by both side portions 160*c* and 160*c*. By this, the sliding piece 156 is adapted to be slidable in the vertical direction between the raised portions 160*c* and 160*c*, and the force received at the hole 178 is branched into two forces at holes 179 and 179.

In the sliding piece 156, the first force transmission means 134 as shown in FIG. 12 is guided through the opening 162 of the force diverging case 155 as shown in FIG. 16, and the notch 168 mounted on the raised portion 160*a*. The second end of the first force transmission mechanism 134 is fixed by using a fixing means 180 such as screw inserted into the single hole 178 in the base portion 175 of the sliding piece 156 (See FIG. 21). In addition, a first end of each of the pair of second force transmission mechanisms 135 passes into one of the pair of holes 179 and 179 in the force diverging portion 177 of the sliding piece 156. The first end is fixed by the end holding body 181 formed as a cylindrical column body similar to the first end of the first force transmission mechanisms 134 shown in FIG. 12. Since the end holding body 181 is supported by the force diverging portion 177, each of the second force transmission mechanisms 135 is coupled with an immobilizing device 133 through the holes 179 in the force diverging portion 177 of the sliding piece 156 and through the openings 169 and 169 of the force diverging case 155 and the openings 163 and 163, as shown in FIGS. 21 and 22.

Figure 23:
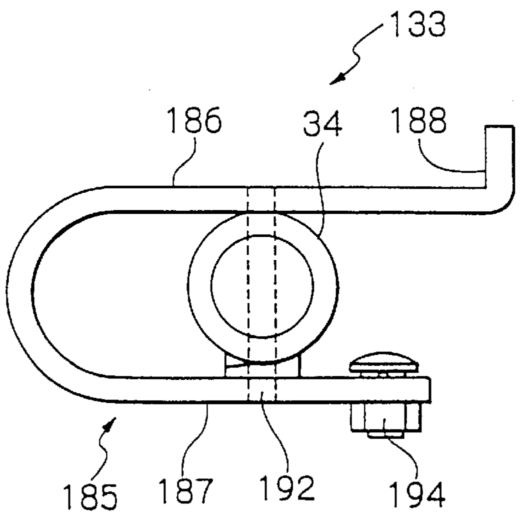
FIG. 23 is a sectional view showing the immobilizing device.
Figure 24:
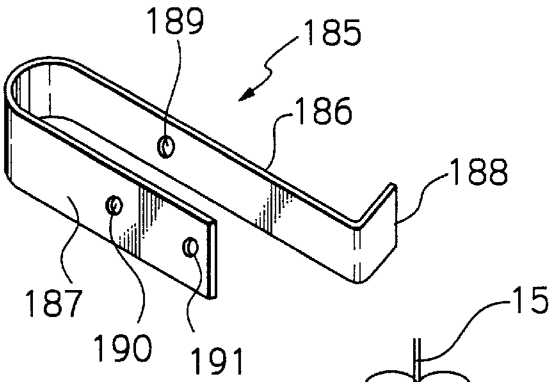
FIG. 24 is a perspective view showing the immobilizing member of the immobilizing device.
Figure 25:
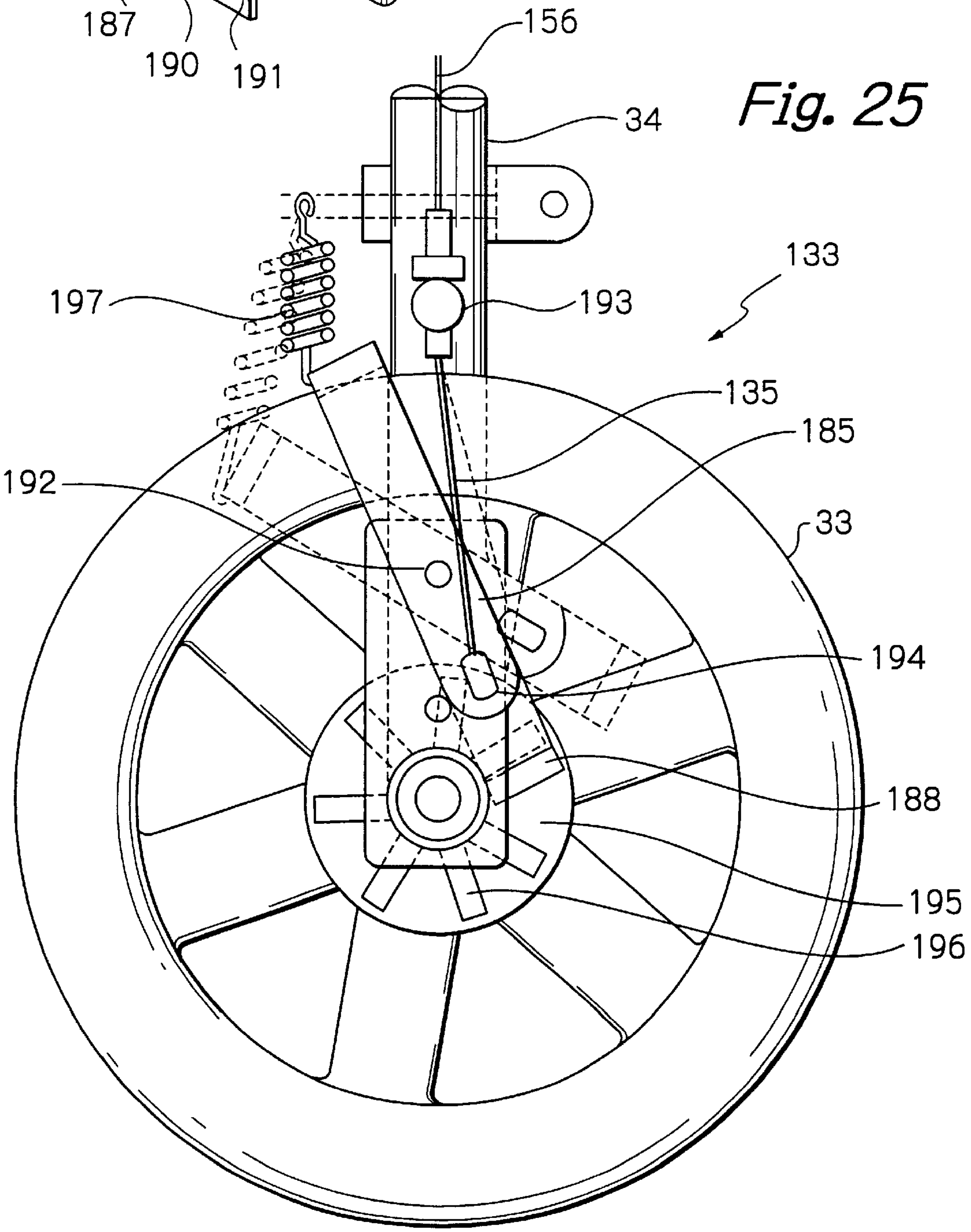
FIG. 25 is a view for explaining the operation of the immobilizing device.

FIGS. 23 to 25 show the embodiment of the immobilizing device 133 of the present invention. In FIG. 23, numeral 185 denotes an immobilizing member composed of a pair of legs with an approximately U-letter shape, and it is favorable to form the immobilizing member from a material such as iron which is not easily deformed. A first leg 186 of each immobilizing member 185 is longer than that of the second leg 187, and its end is bent outwardly at a right angle to form a stopping piece 188. The first leg 186 has a hole 189, and the second leg 187 has a hole 190 at a position opposite to the hole 189 and has a second hole 191 at a position adjacent to the end thereof.

Each immobilizing member 185 pivots at a predetermined position on one of the pair of rear legs 34 of the walker for the aged by using a pin 192 as shown in FIGS. 9, 23 and 25. A stopper member 193 is fixed on each of the rear legs 34 at a position above the predetermined position mentioned above, respectively. The stopper members 193 are formed with holes through which the wire cord as each of the second force transmission mechanisms 135 is passed. The end of the wire cord as the second force transmission mechanism 135, which extends through the stopper member 193, is fixed in the hole 191 formed at the end of the second leg 187 of the stopper member 185 by using a fixing means 194 such as a screw. Therefore, if the wire cord as the second force transmission mechanism 135 is operated, the immobilizing members 185 rotate around the pins 192 between the solid line and the dotted line in FIG. 25, respectively. In the condition as shown in the solid line, the stopping piece 188 at the end of the first leg 186 of the immobilizing member 185 is within the radius of a moving circle formed by the outer edges of projecting portions 196 (seven pieces in this embodiment) arranged to extend in the radial direction at the periphery of the central hub 195 of the wheel 33 so that the rotation of the wheel 33 is stopped. If the immobilizing member 185 is moved to the position as shown by the dotted line, the contact piece 188 moves apart from the radius of the moving circle formed by the projecting portions 196 arranged at the periphery of the central hub of the wheel 33 so that the wheel 33 can rotate. Numeral 197 denotes a spring member having a first end of which is fixed on the stopper member 185 and a second end which is mounted at a suitable position on the walker 30 for the aged such as a spring receiving pin or a spring receiving opening.

According to the above embodiment, each of the stopper members 185 is formed with a pair of legs to form a U-letter shape. However, it may be possible to provide the stopping piece 188 and the fixing means 194 on only one leg, i.e., the leg 186 so that the second leg may be omitted.

The operation of the walker of the present invention will be described hereinafter. When the walker 30 for the aged is in a moving condition, the operation lever 83 is risen as shown in FIGS. 8 and 12. At this time, the end holding body 149 of the first force transmission mechanism 134 is oriented upwardly as shown in FIG. 12. Therefore, the first force transmission mechanism 134 holds the sliding piece 156 within the force diverging case 155 as shown by the dotted line in FIG. 21. The pair of second force transmission mechanisms 135 branched in two directions by the holes 179 and 179 of the sliding piece 156 maintain the condition that the immobilizing member 185 is moved to the dotted position against the resilient force due to the spring member 197, and the contact piece 188 is moved to the upper position so as to enable the free movement of the walker 30 for the aged. At this position, as is apparent from FIG. 12, the end holding body 149 of the first force transmission mechanism 134 is located at the right side of the rotation center of the operation lever 83. In addition, the operation portion 145 of the operation lever 83 contacts the stopping portion 152 of the fixing member 140 so that its rotation is inhibited so as to maintain the stable movement of the walker 30 for the aged.

If the user operates the operation portion 145 of the operation lever 83 in the counterclockwise direction in FIG. 12, the end holding body 149 of the first force transmission mechanisms 134 moves to the position as shown by the dotted line in FIG. 12. By this, the first force transmission mechanisms 134 depresses the sliding piece 156 in the force diverging case 155 from the position shown by the dotted line to the position shown by the solid line in FIG. 21. Therefore, the pair of second force transmission mechanisms 135 branched along two directions by the holes 179 and 179 of the sliding piece 156 allow the the immobilizing member 185 to pivot against the resilient force due to the spring member 197 from the upper position shown by the dotted line to the lower position shown by the solid line, as shown in FIG. 25. Thus, the contact pieces 188 are simultaneously engaged against the projecting portions 196 mounted on the periphery of the central hub of the left and right rear wheels, respectively, so as to completely stop the walker 30 for the aged. If the user wants to release the inhibited condition, it is sufficient to move the operation lever 83 from the position shown by the dotted line to the position shown by the solid line in FIG. 12. In addition, it may be possible to fix the end holding body 181 of the second force transmission mechanism 135 to the hole 179 of the sliding piece 156 in place of using the spring member 197.

Figure 26:
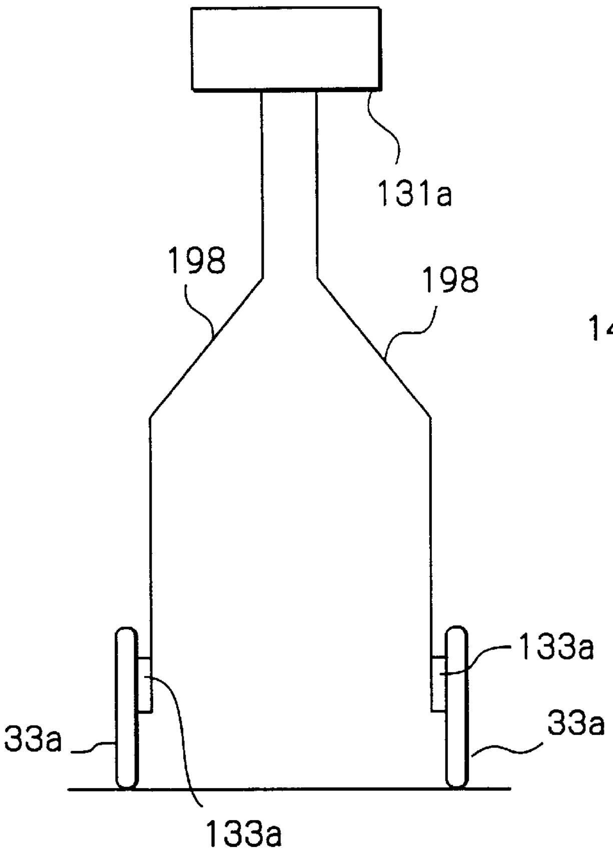
FIG. 26 is a conceptual view similar to FIG. 10 showing another embodiment of the present invention.
Figure 27:
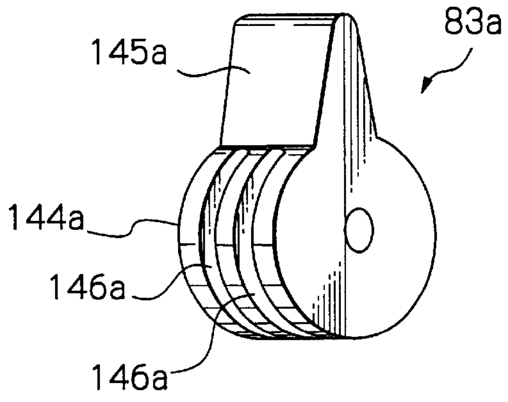
FIG. 27 is a perspective view similar to FIG. 13 showing another embodiment of the present invention.
Figure 28:
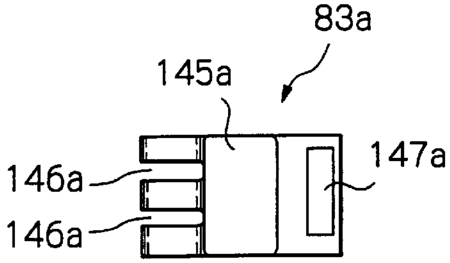
FIG. 28 is a view similar to FIG. 15 showing another embodiment of the present invention.
Figure 29:
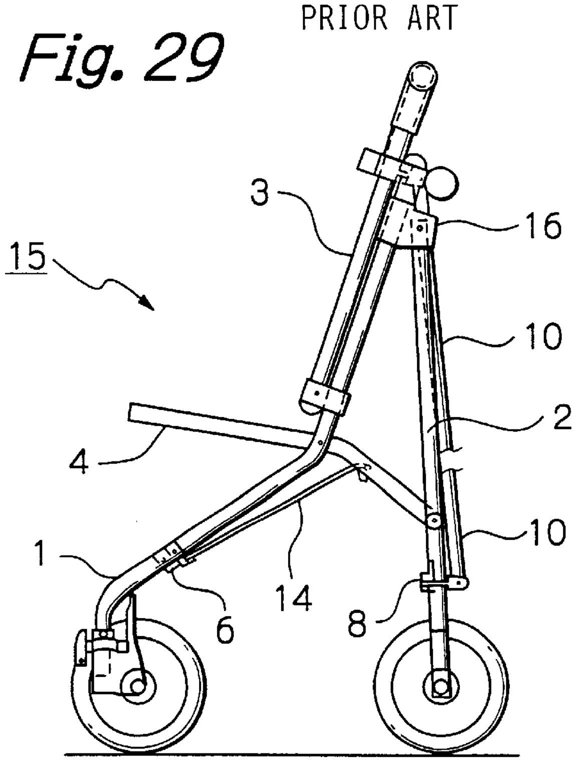
Fig. 29 PRIOR ART
FIG. 29 is a side view showing the walker of the prior art.
Figure 30:
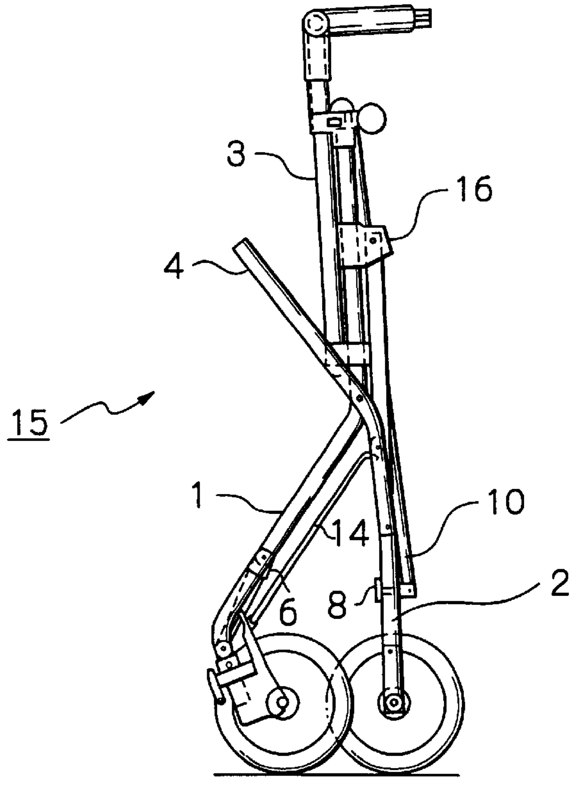
Fig. 30 PRIOR ART
FIG. 30 is a side view showing the walker of FIG. 29 in the folded condition.
Figure 31:
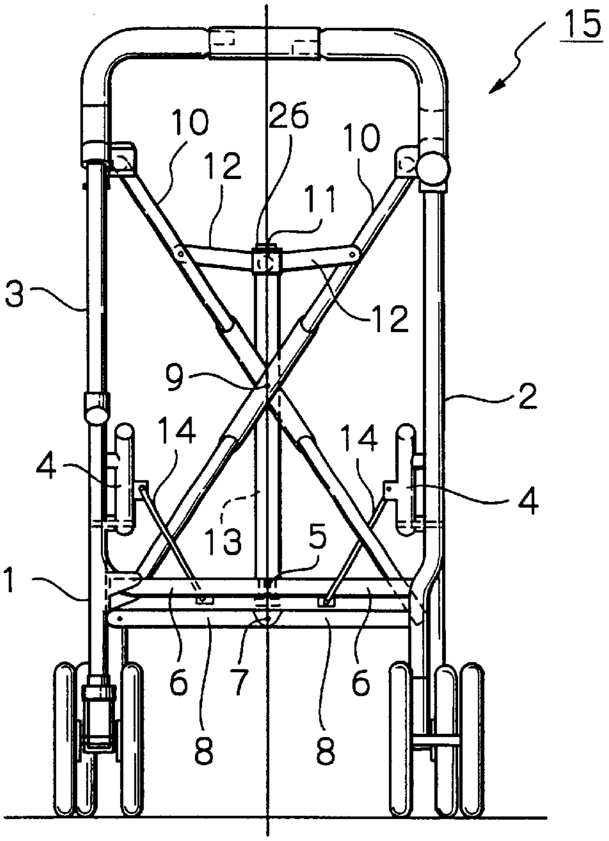
Fig. 31 PRIOR ART
FIG. 31 is a view showing the walker of FIG. 29 in the opened condition, wherein the left half of FIG. 31 is a front view of the walker, and the right half of FIG. 31 is a rear view of the walker.
Figure 32:
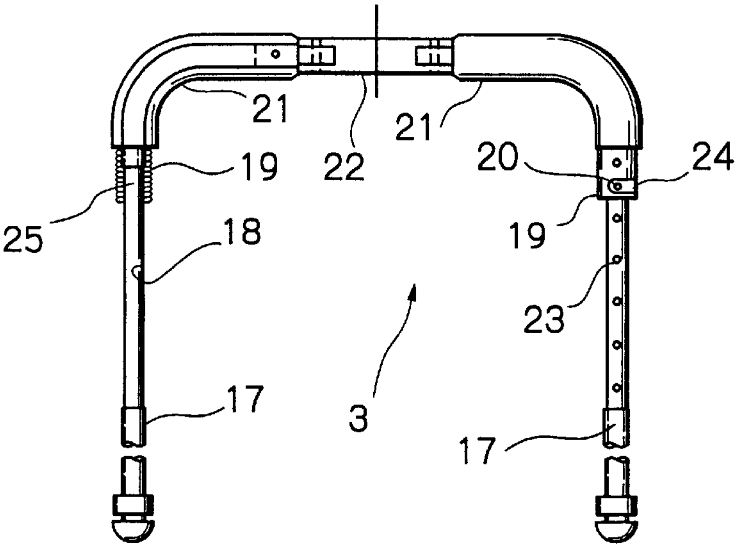
Fig. 32 PRIOR ART
FIG. 32 is a view for explaining the push rod used for the prior art walker of FIG. 29.
Figure 33:
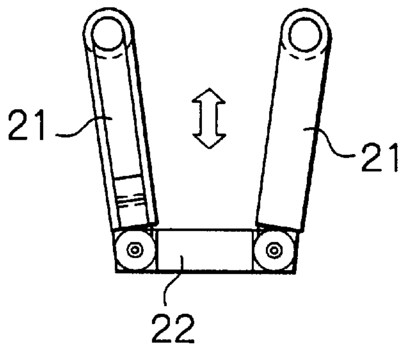
Fig. 33 PRIOR ART
FIG. 33 is a view showing folded condition of the connecting rod used for the prior art push rod of FIG. 32.
Figure 34A:
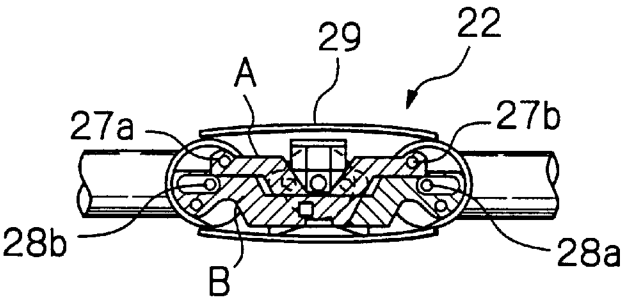
Fig. 34A PRIOR ART
FIGS. 34A and 34B are views showing the inner side of the known connecting rod.
Figure 34B:
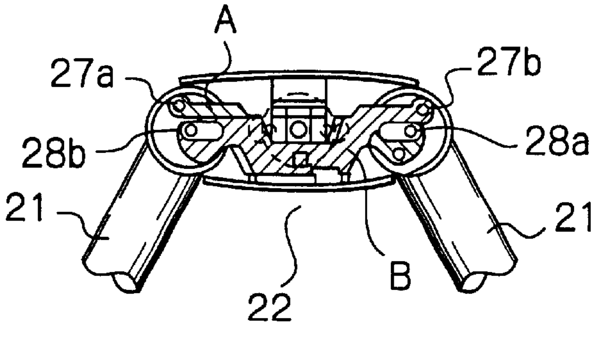
Fig. 34B PRIOR ART

FIGS. 26 to 28 show a second embodiment of the present invention. This embodiment is different from the embodiment as mentioned with reference to FIGS. 8 to 25 as follows. According to the embodiment as mentioned above, as shown in FIG. 10, the force from to the operation mechanism 131 is transmitted to the force diverging mechanism 132 through the first force transmission mechanism 134, and the force is branched so as to be able to stop both of the left and right wheels simultaneously. Then the force is transmitted to the left and right rear wheels through the pair of second force transmission mechanisms 135 and 135 to stop them simultaneously.

In the second embodiment, the stopping force due to the operation mechanism **131*a* is directly transmitted to the left and right rear wheels 33*a* and 33*a* simultaneously through a pair of force transmission mechanisms 198 and 198 as shown in FIG. 26. Therefore, the force diverging mechanism 132 of the previous embodiment may be omitted which results in advantages compared to the first embodiment. Specifically, according to the second embodiment, the pair of second force transmission mechanisms 135 and 135 in the first embodiment as shown in FIG. 10 are connected directly to the operation mechanism 131 as is apparent from FIG. 26. Therefore, the substantial difference therebetween resides in the operation mechanisms 131 and 131*a* and, especially, the operation levers 83 and 83*a*. The difference between the operation levers 83 and 83*a* will be described hereinafter. According to the second embodiment as shown in FIG. 26, the operation lever 83*a* is somewhat larger in thickness as shown in FIGS. 27 and 28 than that of the operation lever 83 as shown in FIG. 13. Furthermore, two grooves 146*a* and 146*a* are provided in parallel with each other so as to be able to rotate the paired force transmission mechanisms 198 independently and simultaneously. Therefore, as shown in FIG. 28, the dimension of the straight hole 147*a* for receiving the end holding body (not shown) of the force transmission mechanisms 198 is twice that shown in FIG. 15. Therefore, the portion for receiving the operation lever of the fixing member (140 in FIG. 11) for receiving the operation lever 83*a*, is also made wider. If the operation portion 145*a* of the operation lever 83*a* is operated, the force transmission mechanisms 198 actuates the pair of immobilizing devices 133*a* to stop the rotation of the rear wheels 33*a* and 33*a*** simultaneously. The details of the other portions are substantially the same as that of the previous embodiment.

Moreover, in the first embodiment of the present invention as shown in FIGS. 8 to 25, it will be apparent to those skilled in the art that the number of holes 179 of the sliding piece 156 of FIG. 20 may be three or four, and there may be three or four of the second force transmission mechanisms 135 so as to stop all three of the wheels (which is suitable for a baby walker) or all four wheels simultaneously.

According to the walker 30 of the present invention, the second reinforcing section 59 is composed of at least one pair of traction rods 58 each having a lower end which pivots on the front legs 32 at a position adjacent to the front wheels 31 of one side (right side or left side) of the walker 30, and has an upper end which pivots on a seat rod 38 at a position between the pivot pin 37 and the seat rod 38 on the other side (left side or right side) of the walker with respect to the side where the lower end pivots. The traction rods 58 are arranged to form an X-letter shape. Therefore, the left and right shaking and distortion of the walker 30 of the present invention can be eliminated completely.

According to the walker 30 of the present invention, each tension device 61 is composed of one pair of tension rods 60 having an outer end which pivots on the front legs 32 and the rear legs 34 of one side (right side or left side), respectively. The inner ends pivot with each other by using pins or the like and, therefore, the shaking in the front and rear direction and the distortion of the walker 30 of the present invention can be eliminated completely.

Thus, according to the present invention, the walker can not only be smoothly folded in the front and rear direction and the widthwise direction upon non usage of the walker, but it is also effective to avoid shaking in the front and rear direction and the widthwise direction when in the opened condition.

Moreover the coupling rod 67 has a very simple structure, its operation is smooth, and its cost is not expensive.

Furthermore, since the walker of the present invention can be folded in the front and rear direction and the widthwise direction, the space required for storing it may be made extremely small.

Moreover, according to the present invention, the number of manufacturing elements for the folding and opening mechanism can be minimized. Therefore, the number of manufacturing parts can be minimized, the folding mechanism can be simplified, its weight can be minimized, the folding and opening operations can be achieved easily and smoothly, and the handling of the walker may be simplified.

In addition, according to the present invention, even when the walker is folded in the front and rear direction and the widthwise direction, the front wheels and the rear wheels always contact the ground. Therefore, the walker can be maintained in the standing condition, and the operations for storing it, folding it, and opening it can be easily achieved. Moreover, the coupling rod 67 of the present invention has a very simple structure, and therefore it always operates smoothly and is not expensive. The coupling rod of the present invention is very useful for a walker which is foldable in the front and rear direction and the widthwise direction.

Moreover, the immobilizing unit of the present invention has a light weight, and it is not necessary when operating the immobilizing unit to use the user's foot. In addition, its operation is very easy when going down a slope. Furthermore, since the immobilizing unit of the present invention is very compact, it is very easy to adapt the immobilizing unit into the folding mechanism installed in a walker for the aged and a baby walker. Furthermore, it is very easy to achieve the stopping operation for both the left and right wheels simultaneously without any danger that only a single wheel is stopped.

What is claimed is:

1. A walker comprising:

a pair of front legs;

a pair of rear legs;

a push rod having a first side and a second side, each of said first side and said second side being connected to a respective one of said pair of front legs;

a slider member for slidably connecting an upper end of each of said pair of rear legs to a respective one of said pair of front legs or a respective one of said first side and said second side of said push rod;

a pair of seat rods, each of said pair of seat rods having a first end pivotally connected to a respective one of said pair of rear legs, and each of said pair of seat rods having an intermediate position pivotally connected to a respective one of said pair of front legs;

a front leg connecting member including a pair of rigid members, each of said pair of rigid members having an outer end pivotally connected to a respective one of said pair of front legs, and each of said pair of rigid members having an inner end, said pair of rigid members being pivotally connected together at said inner end of each of rigid members;

a rear leg connecting member including a pair of rigid members, each of said pair of rigid members having an outer end pivotally connected to a respective one of said pair of rear legs, and each of said pair of rigid members having an inner end, said pair of rigid members being pivotally connected together at said inner end of each of rigid members;

a pair of open/close rods, each of said open/close rods having a lower end pivotally connected to a respective one of said pair of rear legs, and each of said open/close rods having an upper end pivotally connected to a respective one of said first side and said second side of said push rod, said upper end and said lower end of each of said open/close rods being connected at opposite sides of the walker such that said pair of open/close rods intersect at a pivot point so as to form an X-shape, said pair of open/close rods being rotatably connected by a pivot pin at said pivot point;

a pair of operation rods, each of said pair of operation rods having an outer end pivotally connected to a respective one of said pair of open/close rods above said pivot pin, and each of said pair of operation rods having an inner end, said pair of operation rods being rotatably supported by a pivot member at said inner end of each of operation rods;

a pair of tension devices, each of said pair of tension devices including a first tension rod having an outer end pivotally connected to a respective one of said pair of front legs and having an inner end, and including a second tension rod having an outer end pivotally connected to a respective one of said pair of rear legs and having an inner end, said inner end of said first tension rod and said inner end of said second tension rod being pivotally connected; and a pair of traction rods, each of said pair of traction rods having a lower end pivotally connected to a respective one of said front legs, and having an upper end pivotally connected to a respective one of said seat rods at a pivot position between said intermediate position and a second end of said seat rod, said upper end and said lower end of each of said pair of traction rods being connected at opposite sides of the walker such that said pair of traction rods form an X-shape.

2. The walker of claim 1, wherein said pair of traction rods comprises a first pair of traction rods, further comprising a second pair of traction rods, each of said second pair of traction rods having a lower end pivotally connected to a respective one of said rigid members of said front leg connecting member, and having an upper end pivotally connected to a respective one of said seat rods at a pivot position between said intermediate position and said first end of said seat rod, said upper end and said lower end of each of said second pair of traction rods being connected at opposite sides of the walker such that said second pair of traction rods form an X-shape.

3. The walker of claim 1, wherein said push rod comprises a pair of vertical portions and a lateral portion connecting said pair of vertical portions, each of said pair of vertical portions having a fixed lower portion and a rotatable upper portion rotatable with respect to said fixed lower portion, said lateral portion including a coupling rod and a connection rod rotatably connected at each end of said coupling rod, said coupling rod comprising:

a pair of sliding bodies operable to engage said connection rod at each end of said coupling rod when the walker is in an open condition, and operable to disengage said connection rod at each end of said coupling rod when the walker is in a folded condition;

a spring connected to each of said pair of sliding bodies for providing a resilient force to urge said pair of sliding bodies to move together;

an actuator for moving said pair of sliding bodies against a resilient force of said spring such that said pair of sliding bodies engage and disengage said connection rod at each end of said coupling rod; and a knob for driving said actuator.

4. The walker of claim 3, wherein said coupling rod further comprises a lower housing having a raised portion extending in a longitudinal direction of said coupling rod, said raised portion including a contact surface at each end of said raised portion for restricting a rotation of said connection rod at each end of said coupling rod.

5. The walker of claim 4, wherein said connection rod at each end of said coupling rod has a first end fixed to a respective one of said vertical portions, and has a cam having a recess for engagement with one of said pair of sliding bodies, said cam being operable to rotate with respect to said coupling rod so as to contact said contact surface.

6. The walker of claim 1, further comprising an immobilizing unit including:

an operation mechanism including an operation lever having a rotation portion and an operation portion, said rotation portion being pivotally mounted in said operation mechanism and having a peripheral groove and a straight hole connecting an outer surface of said rotation portion and a bottom of said groove;

a plurality of immobilizing devices, each of said immobilizing devices including a leg having a contact piece, said leg being pivotally mounted on a respective one of said pair of front legs or a respective one said pair of rear legs;

a plurality of force transmission mechanisms, a first end of said plurality of force transmission mechanisms being received in said straight hole of said rotation portion of said operation mechanism and a second end of said plurality of force transmission mechanisms being fixed to each of said plurality of immobilizing devices so as to connect said operation mechanism to each of said plurality of immobilizing devices so as to maintain a predetermined distance between said operation mechanism and each of said plurality of immobilizing devices, said plurality of force transmission mechanisms being operable to simultaneously transmit a movement of said operation mechanism to said plurality of immobilizing devices.

7. The walker of claim 6, wherein said immobilizing unit further includes a force diverging mechanism between said operation mechanism and said plurality of immobilizing devices, said operation mechanism and said force diverging mechanism being connected by a single force transmission mechanism, and said force diverging mechanism and said plurality of immobilizing devices being connected by a plurality of force transmission mechanisms.

8. The walker of claim 7, wherein said force diverging mechanism is mounted at said pivot point whereat said pair of open/close rods intersect.

9. The walker of claim 6, wherein said rotation portion of said operation lever has a plurality of peripheral grooves.

10. The walker of claim 6, wherein said operation mechanism is mounted on said push rod.

11. The walker of claim 6, wherein said operation mechanism is mounted on one of said pair of seat rods.

12. The walker of claim 6, wherein said force diverging mechanism includes a force diverging case and a sliding piece operable to slide within said force diverging case.

13. A walker comprising:

a pair of front legs;

a pair of rear legs;

a push rod having a pair of vertical portions and a lateral portion connecting said pair of vertical portions, each of said pair of vertical portions being connected to a respective one of said pair of front legs;

a slider member for slidably connecting an upper end of each of said pair of rear legs to a respective one of said pair of front legs or a respective one of said pair of vertical portions of said push rod;

a pair of seat rods, each of said pair of seat rods having a first end pivotally connected to a respective one of said pair of rear legs, and each of said pair of seat rods having an intermediate position pivotally connected to a respective one of said pair of front legs;

a front leg connecting member including a pair of rigid members, each of said pair of rigid members having an outer end pivotally connected to a respective one of said pair of front legs, and each of said pair of rigid members having an inner end, said pair of rigid members being pivotally connected together at said inner end of each of rigid members;

a rear leg connecting member including a pair of rigid members, each of said pair of rigid members having an outer end pivotally connected to a respective one of said pair of rear legs, and each of said pair of rigid members having an inner end, said pair of rigid members being pivotally connected together at said inner end of each of rigid members;

a pair of open/close rods, each of said open/close rods having a lower end pivotally connected to a respective one of said pair of rear legs, and each of said open/close rods having an upper end pivotally connected to a respective one of said pair of vertical portions of said push rod, said upper end and said lower end of each of said open/close rods being connected at opposite sides of the walker such that said pair of open/close rods intersect at a pivot point so as to form an X-shape, said pair of open/close rods being rotatably connected by a pivot pin at said pivot point;

a pair of operation rods, each of said pair of operation rods having an outer end pivotally connected to a respective one of said pair of open/close rods above said pivot pin, and each of said pair of operation rods having an inner end, said pair of operation rods being rotatably supported by a pivot member at said inner end of each of operation rods;

a pair of tension devices, each of said pair of tension devices including a first tension rod having an outer end pivotally connected to a respective one of said pair of front legs and having an inner end, and including a second tension rod having an outer end pivotally connected to a respective one of said pair of rear legs and having an inner end, said inner end of said first tension rod and said inner end of said second tension rod being pivotally connected; and a pair of traction rods, each of said pair of traction rods having a lower end pivotally connected to a respective one of said front legs, and having an upper end pivotally connected to a respective one of said seat rods at a pivot position between said intermediate position and a second end of said seat rod, said upper end and said lower end of each of said pair of traction rods being connected at opposite sides of the walker such that said pair of traction rods form an X-shape.

14. The walker of claim 13, wherein said pair of traction rods comprises a first pair of traction rods, further comprising a second pair of traction rods, each of said second pair of traction rods having a lower end pivotally connected to a respective one of said rigid members of said front leg connecting member, and having an upper end pivotally connected to a respective one of said seat rods at a pivot position between said intermediate position and said first end of said seat rod, said upper end and said lower end of each of said second pair of traction rods being connected at opposite sides of the walker such that said second pair of traction rods form an X-shape.

15. The walker of claim 13, wherein each of said pair of vertical portions of said push rod have a fixed lower portion and a rotatable upper portion rotatable with respect to said fixed lower portion, said lateral portion including a coupling rod and a connection rod rotatably connected at each end of said coupling rod, said coupling rod comprising:

a pair of sliding bodies operable to engage said connection rod at each end of said coupling rod when the walker is in an open condition, and operable to disengage said connection rod at each end of said coupling rod when the walker is in a folded condition;

a spring connected to each of said pair of sliding bodies for providing a resilient force to urge said pair of sliding bodies to move together;

an actuator for moving said pair of sliding bodies against a resilient force of said spring such that said pair of sliding bodies engage and disengage said connection rod at each end of said coupling rod; and a knob for driving said actuator.

16. The walker of claim 15, wherein said coupling rod further comprises a lower housing having a raised portion extending in a longitudinal direction of said coupling rod, said raised portion including a contact surface at each end of said raised portion for restricting a rotation of said connection rod at each end of said coupling rod.

17. The walker of claim 16, wherein said connection rod at each end of said coupling rod has a first end fixed to a respective one of said vertical portions, and has a cam having a recess for engagement with one of said pair of sliding bodies, said cam being operable to rotate with respect to said coupling rod so as to contact said contact surface.

18. The walker of claim 13, further comprising an immobilizing unit including:

an operation mechanism including an operation lever having a rotation portion and an operation portion, said rotation portion being pivotally mounted in said operation mechanism and having a peripheral groove and a straight hole connecting an outer surface of said rotation portion and a bottom of said groove;

a plurality of immobilizing devices, each of said immobilizing devices including a leg having a contact piece, said leg being pivotally mounted on a respective one of said pair of front legs or a respective one said pair of rear legs;

a plurality of force transmission mechanisms, a first end of said plurality of force transmission mechanisms being received in said straight hole of said rotation portion of said operation mechanism and a second end of said plurality of force transmission mechanisms being fixed to each of said plurality of immobilizing devices so as to connect said operation mechanism to each of said plurality of immobilizing devices so as to maintain a predetermined distance between said operation mechanism and each of said plurality of immobilizing devices, said plurality of force transmission mechanisms being operable to simultaneously transmit a movement of said operation mechanism to said plurality of immobilizing devices.

19. The walker of claim 18, wherein said immobilizing unit further includes a force diverging mechanism between said operation mechanism and said plurality of immobilizing devices, said operation mechanism and said force diverging mechanism being connected by a single force transmission mechanism, and said force diverging mechanism and said plurality of immobilizing devices being connected by a plurality of force transmission mechanisms.

20. The walker of claim 19, wherein said force diverging mechanism is mounted at said pivot point whereat said pair of open/close rods intersect.

21. The walker of claim 18, wherein said rotation portion of said operation lever has a plurality of peripheral grooves.

22. The walker of claim 18, wherein said operation mechanism is mounted on said push rod.

23. The walker of claim 18, wherein said operation mechanism is mounted on one of said pair of seat rods.

24. The walker of claim 18, wherein said force diverging mechanism includes a force diverging case and a sliding piece operable to slide within said force diverging case.

25. A walker comprising:

a pair of front legs;

a pair of rear legs;

a push rod having a pair of side portions and a coupling rod connecting said pair of side portions, each of said side portions including a lower rod connected to a respective one of said pair of front legs, and including an upper rod having a vertical portion connected to said lower rod and a horizontal portion connected to said coupling rod, whereby said push rod has a U-shape;

a slider member for slidably connecting an upper end of each of said pair of rear legs to a respective one of said pair of front legs or a respective one of said pair of side portions of said push rod;

a pair of seat rods, each of said pair of seat rods having a first end pivotally connected to a respective one of said pair of rear legs, and each of said pair of seat rods having an intermediate position pivotally connected to a respective one of said pair of front legs;

a front leg connecting member including a pair of rigid members, each of said pair of rigid members having an outer end pivotally connected to a respective one of said pair of front legs, and each of said pair of rigid members having an inner end, said pair of rigid members being pivotally connected together at said inner end of each of rigid members;

a rear leg connecting member including a pair of rigid members, each of said pair of rigid members having an outer end pivotally connected to a respective one of said pair of rear legs, and each of said pair of rigid members having an inner end, said pair of rigid members being pivotally connected together at said inner end of each of rigid members by a pivot member;

a pair of open/close rods, each of said open/close rods having a lower end pivotally connected to a respective one of said pair of rear legs, and each of said open/close rods having an upper end pivotally connected to a respective one of said pair of side portions of said push rod, said upper end and said lower end of each of said open/close rods being connected at opposite sides of the walker such that said pair of open/close rods intersect at a pivot point so as to form an X-shape, said pair of open/close rods being rotatably connected by a pivot pin at said pivot point;

a pair of operation rods, each of said pair of operation rods having an outer end pivotally connected to a respective one of said pair of open/close rods above said pivot pin, and each of said pair of operation rods having an inner end, said pair of operation rods being rotatably supported by a pivot member at said inner end of each of operation rods;

an interlocking member interlocking said pivot member rotatably supporting said inner end of each of said pair of operation rods and said pivot member pivotally connecting said rigid members of said rear leg connecting member;

a pair of tension devices, each of said pair of tension devices including a first tension rod having an outer end pivotally connected to a respective one of said pair of front legs and having an inner end, and including a second tension rod having an outer end pivotally connected to a respective one of said pair of rear legs and having an inner end, said inner end of said first tension rod and said inner end of said second tension rod being pivotally connected; and a pair of traction rods, each of said pair of traction rods having a lower end pivotally connected to a respective one of said front legs, and having an upper end pivotally connected to a respective one of said seat rods at a pivot position between said intermediate position and a second end of said seat rod, said upper end and said lower end of each of said pair of traction rods being connected at opposite sides of the walker such that said pair of traction rods form an X-shape.

26. The walker of claim 25, wherein said pair of traction rods comprises a first pair of traction rods, further comprising a second pair of traction rods, each of said second pair of traction rods having a lower end pivotally connected to a respective one of said rigid members of said front leg connecting member, and having an upper end pivotally connected to a respective one of said seat rods at a pivot position between said intermediate position and said first end of said seat rod, said upper end and said lower end of each of said second pair of traction rods being connected at opposite sides of the walker such that said second pair of traction rods form an X-shape.

27. The walker of claim 25, wherein each of said lower rods of said side portions of said push rod comprises a fixed lower rod, and each of said upper rods of said side portions of said push rod comprises rotatable upper rod rotatable with respect to said fixed lower rod, each of said pair of side portions of said push rod further including a connection rod rotatably connected to each end of said coupling rod, said coupling rod comprising:

a pair of sliding bodies operable to engage said connection rod at each end of said coupling rod when the walker is in an open condition, and operable to disengage said connection rod at each end of said coupling rod when the walker is in a folded condition;

a spring connected to each of said pair of sliding bodies for providing a resilient force to urge said pair of sliding bodies to move together;

an actuator for moving said pair of sliding bodies against a resilient force of said spring such that said pair of sliding bodies engage and disengage said connection rod at each end of said coupling rod; and a knob for driving said actuator.

28. The walker of claim 27, wherein said coupling rod further comprises a lower housing having a raised portion extending in a longitudinal direction of said coupling rod, said raised portion including a contact surface at each end of said raised portion for restricting a rotation of said connection rod at each end of said coupling rod.

29. The walker of claim 28, wherein said connection rod at each end of said coupling rod has a first end fixed to a respective one of said vertical portions, and has a cam having a recess for engagement with one of said pair of sliding bodies, said cam being operable to rotate with respect to said coupling rod so as to contact said contact surface.

30. The walker of claim 25, further comprising an immobilizing unit including:

an operation mechanism including an operation lever having a rotation portion and an operation portion, said rotation portion being pivotally mounted in said operation mechanism and having a peripheral groove and a straight hole connecting an outer surface of said rotation portion and a bottom of said groove;

a plurality of immobilizing devices, each of said immobilizing devices including a leg having a contact piece, said leg being pivotally mounted on a respective one of said pair of front legs or a respective one said pair of rear legs;

a plurality of force transmission mechanisms, a first end of said plurality of force transmission mechanisms being received in said straight hole of said rotation portion of said operation mechanism and a second end of said plurality of force transmission mechanisms being fixed to each of said plurality of immobilizing devices so as to connect said operation mechanism to each of said plurality of immobilizing devices so as to maintain a predetermined distance between said operation mechanism and each of said plurality of immobilizing devices, said plurality of force transmission mechanisms being operable to simultaneously transmit a movement of said operation mechanism to said plurality of immobilizing devices.

31. The walker of claim 30, wherein said immobilizing unit further includes a force diverging mechanism between said operation mechanism and said plurality of immobilizing devices, said operation mechanism and said force diverging mechanism being connected by a single force transmission mechanism, and said force diverging mechanism and said plurality of immobilizing devices being connected by a plurality of force transmission mechanisms.

32. The walker of claim 31, wherein said force diverging mechanism is mounted at said pivot point whereat said pair of open/close rods intersect.

33. The walker of claim 30, wherein said rotation portion of said operation lever has a plurality of peripheral grooves.

34. The walker of claim 30, wherein said operation mechanism is mounted on said push rod.

35. The walker of claim 30, wherein said operation mechanism is mounted on one of said pair of seat rods.

36. The walker of claim 30, wherein said force diverging mechanism includes a force diverging case and a sliding piece operable to slide within said force diverging case.

* * * * *